(12) United States Patent
Sun et al.

(10) Patent No.: US 12,134,200 B2
(45) Date of Patent: Nov. 5, 2024

(54) SINGULATION OF ARBITRARY MIXED ITEMS

(71) Applicant: Dexterity, Inc., Redwood City, CA (US)

(72) Inventors: Zhouwen Sun, Redwood City, CA (US); Kevin Jose Chavez, Redwood City, CA (US); Samir Menon, Atherton, CA (US); Harry Zhe Su, Union City, CA (US); Talbot Morris-Downing, Redwood City, CA (US); Rohit Arka Pidaparthi, Mountain View, CA (US); Ayush Sharma, Belmont, CA (US); Raphael Georg Wirth, Breisach (DE)

(73) Assignee: Dexterity, Inc., Redwood City, CA (US)

( * ) Notice: Subject to any disclaimer, the term of this patent is extended or adjusted under 35 U.S.C. 154(b) by 0 days.

(21) Appl. No.: 18/224,427

(22) Filed: Jul. 20, 2023

(65) Prior Publication Data
US 2024/0001559 A1 Jan. 4, 2024

Related U.S. Application Data

(63) Continuation of application No. 17/132,446, filed on Dec. 23, 2020, now Pat. No. 11,752,636, which is a (Continued)

(51) Int. Cl.
*G06F 7/00* (2006.01)
*B07C 1/04* (2006.01)
(Continued)

(52) U.S. Cl.
CPC .............. *B25J 9/1697* (2013.01); *B07C 1/04* (2013.01); *B25J 9/0093* (2013.01); *B25J 9/161* (2013.01);
(Continued)

(58) Field of Classification Search
CPC ........ B25J 9/1697; B25J 9/0093; B25J 9/161; B25J 9/1612; B25J 9/1653; B25J 9/1664;
(Continued)

(56) References Cited

U.S. PATENT DOCUMENTS

| 6,135,268 A | 10/2000 | Couch |
| 7,313,464 B1 | 12/2007 | Perreault |

(Continued)

FOREIGN PATENT DOCUMENTS

| CN | 108604091 | 9/2018 |
| CN | 108778636 | 11/2018 |

(Continued)

OTHER PUBLICATIONS

Rasoul Mojtahedzadeh. "Safe Robotic Manipulation to Extract Objects from Piles: From 3D Perception to Object Selection." Diss. Orebro University, 2016. Sep. 23, 2016 (Sep. 23, 2016) Retrieved on Apr. 25, 2022 (Apr. 25, 2022) from <https://www.diva-portal.org/smash/get/diva2:949839/FULLTEXT01.pdf> entire document.

(Continued)

*Primary Examiner* — Yolanda R Cumbess
(74) *Attorney, Agent, or Firm* — Van Pelt, Yi & James LLP

(57) ABSTRACT

A robotic singulation system is disclosed. In various embodiments, sensor data including image data associated with a workspace is received. The sensor data is used to generate a three dimensional view of at least a portion of the workspace, the three dimensional view including boundaries of a plurality of items present in the workspace. The three dimensional view as generated at successive points in time is used to model a flow of at least a subset of said plurality of items through at least a portion of the workspace. The model is used to determine and implement a plan to autonomously operate a robotic structure to pick one or more items (Continued)

from the workplace and place each item singly in a corresponding location in a singulation conveyance structure.

20 Claims, 20 Drawing Sheets

Related U.S. Application Data continuation of application No. 16/916,605, filed on Jun. 30, 2020, now Pat. No. 10,906,188.

(60) Provisional application No. 62/993,579, filed on Mar. 23, 2020, provisional application No. 62/926,165, filed on Oct. 25, 2019.

(51) Int. Cl.
| | |
|---|---|
| *B25J 9/00* | (2006.01) |
| *B25J 9/16* | (2006.01) |
| *B25J 13/08* | (2006.01) |
| *B25J 15/06* | (2006.01) |
| *B65G 47/90* | (2006.01) |
| *B65G 47/91* | (2006.01) |

(52) U.S. Cl.
CPC ........... *B25J 9/1612* (2013.01); *B25J 9/1653* (2013.01); *B25J 9/1664* (2013.01); *B25J 9/1671* (2013.01); *B25J 9/1689* (2013.01); *B25J 13/08* (2013.01); *B25J 15/0616* (2013.01); *B65G 47/905* (2013.01); *B65G 47/917* (2013.01); *B65G 2201/0285* (2013.01); *B65G 2203/0216* (2013.01); *B65G 2203/041* (2013.01)

(58) Field of Classification Search
CPC ........ B25J 9/1671; B25J 9/1689; B25J 13/08; B25J 15/0616; B25J 19/023; B25J 13/006; B07C 1/04; B07C 2501/0063; B07C 5/36; B65G 47/905; B65G 47/917; B65G 2201/0285; B65G 2203/0216; B65G 2203/041; B65G 47/915; B65G 47/918; B65G 2203/0208; G05B 2219/40161; G05B 2219/40195; G05B 19/4182; G05B 2219/39102; Y02P 90/02
See application file for complete search history.

(56) References Cited

U.S. PATENT DOCUMENTS

| | | | |
|---|---|---|---|
| 8,489,229 B2 | 7/2013 | Kuehnemann | |
| 8,639,382 B1 | 1/2014 | Clark | |
| 9,457,477 B1 | 10/2016 | Rublee | |
| 10,086,510 B1 | 10/2018 | Mcaninch | |
| 10,552,750 B1* | 2/2020 | Raghavan | G06Q 10/087 |
| 10,618,172 B1 | 4/2020 | Diankov | |
| 10,906,188 B1 | 2/2021 | Sun | |
| 10,913,165 B1 | 2/2021 | Jonas | |
| 11,478,942 B1 | 10/2022 | Lee | |
| 11,511,417 B1 | 11/2022 | Meiswinkel | |
| 2002/0153654 A1 | 10/2002 | Blackwell | |
| 2003/0075416 A1 | 4/2003 | Prutu | |
| 2006/0079884 A1 | 4/2006 | Manzo | |
| 2006/0096896 A1 | 5/2006 | Campagnolle | |
| 2011/0076128 A1 | 3/2011 | Johnsen | |
| 2013/0083021 A1 | 4/2013 | Cohen | |
| 2013/0345875 A1 | 12/2013 | Brooks | |
| 2013/0346348 A1 | 12/2013 | Buehler | |
| 2014/0081452 A1 | 3/2014 | Ito | |
| 2014/0257556 A1 | 9/2014 | Pandit | |
| 2015/0168207 A1 | 6/2015 | Pollock | |
| 2015/0225178 A1 | 8/2015 | Wargo | |
| 2016/0090248 A1 | 3/2016 | Worsley | |
| 2016/0093053 A1* | 3/2016 | Watanabe | G06T 7/73 901/44 |
| 2016/0167227 A1* | 6/2016 | Wellman | B65G 1/10 901/3 |
| 2016/0221187 A1 | 8/2016 | Bradski | |
| 2016/0354809 A1 | 12/2016 | Gruna | |
| 2017/0080566 A1* | 3/2017 | Stubbs | G06Q 10/087 |
| 2017/0320210 A1 | 11/2017 | Ding | |
| 2017/0355078 A1 | 12/2017 | Ur | |
| 2017/0356730 A1 | 12/2017 | Wang | |
| 2017/0369244 A1 | 12/2017 | Battles | |
| 2018/0065156 A1 | 3/2018 | Winkle | |
| 2018/0148272 A1 | 5/2018 | Wagner | |
| 2018/0170674 A1 | 6/2018 | Luckay | |
| 2018/0250823 A1 | 9/2018 | Shimodaira | |
| 2018/0281200 A1 | 10/2018 | Rosenstein | |
| 2018/0362270 A1 | 12/2018 | Clucas | |
| 2019/0071261 A1 | 3/2019 | Wertenberger | |
| 2019/0176348 A1 | 6/2019 | Bingham | |
| 2019/0185267 A1 | 6/2019 | Mattern | |
| 2019/0250627 A1* | 8/2019 | Witt | G01C 21/206 |
| 2019/0291277 A1 | 9/2019 | Oleynik | |
| 2019/0315570 A1 | 10/2019 | Nemati | |
| 2019/0337723 A1 | 11/2019 | Wagner | |
| 2020/0017317 A1 | 1/2020 | Yap | |
| 2020/0039676 A1 | 2/2020 | Shamiss | |
| 2020/0086483 A1 | 3/2020 | Li | |
| 2020/0094288 A1 | 3/2020 | Coupar | |
| 2020/0130935 A1 | 4/2020 | Wagner | |
| 2020/0130961 A1 | 4/2020 | Diankov | |
| 2020/0130963 A1 | 4/2020 | Diankov | |
| 2020/0160011 A1 | 5/2020 | Wagner | |
| 2020/0206783 A1 | 7/2020 | Hogervorst | |
| 2020/0311965 A1 | 10/2020 | Mizukami | |
| 2021/0069903 A1 | 3/2021 | Duan | |
| 2021/0179356 A1 | 6/2021 | Chen | |
| 2021/0394364 A1 | 12/2021 | Ogawa | |
| 2022/0016764 A1 | 1/2022 | Yoshida | |

FOREIGN PATENT DOCUMENTS

| | | |
|---|---|---|
| EP | 1897663 | 3/2008 |
| JP | 2017036113 | 2/2017 |
| JP | 2018179859 | 11/2018 |
| JP | 2018203480 | 12/2018 |
| JP | 6611297 | 11/2019 |
| JP | 2020534168 | 11/2020 |
| TW | 202107232 | 2/2021 |
| WO | 2016119829 | 8/2016 |
| WO | 2019215384 | 11/2019 |

OTHER PUBLICATIONS

Wang et al., "Transporting a heavy object on a frictional floor by a mobile manipulator based on adaptive MPC framework," 2021, IEEE (Year: 2021).

* cited by examiner

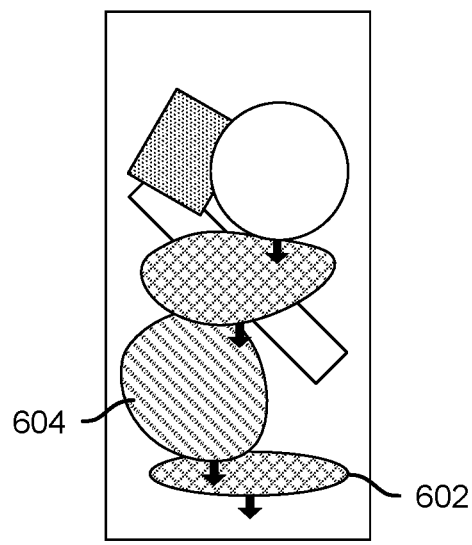 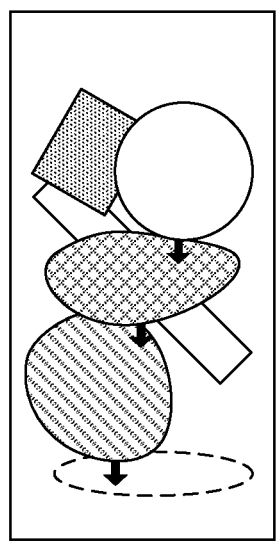 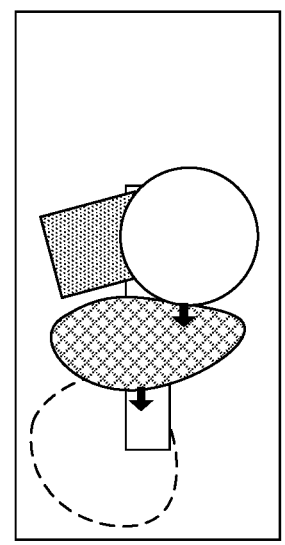
FIG. 6A          FIG. 6B          FIG. 6C
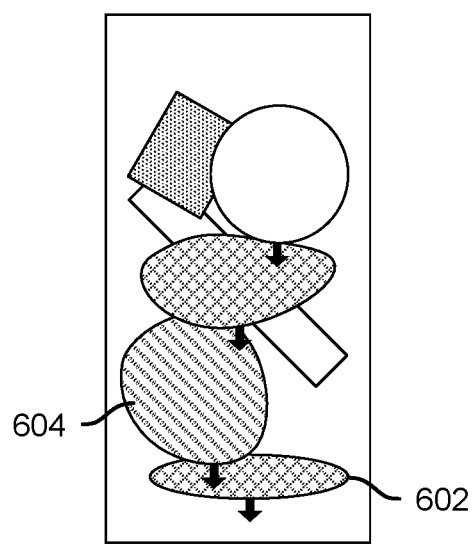 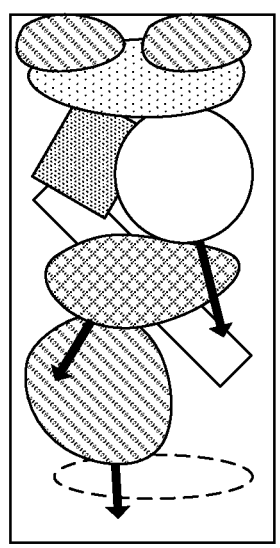 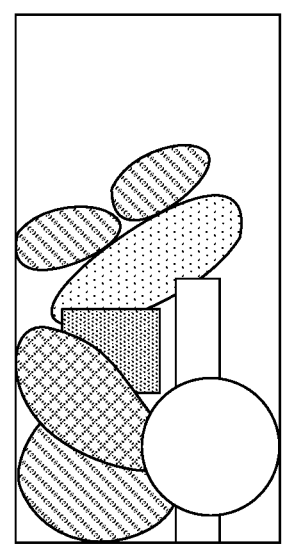
FIG. 6D          FIG. 6E          FIG. 6F

SINGULATION OF ARBITRARY MIXED ITEMS

CROSS REFERENCE TO OTHER APPLICATIONS

This application is a continuation of U.S. patent application Ser. No. 17/132,446, entitled SINGULATION OF ARBITRARY MIXED ITEMS filed Dec. 23, 2020 which is incorporated herein by reference for all purposes, which is a continuation of U.S. patent application Ser. No. 16/916,605, entitled SINGULATION OF ARBITRARY MIXED ITEMS filed Jun. 30, 2020, now U.S. Pat. No. 10,906,188, which is incorporated herein by reference for all purposes, which claims priority to U.S. Provisional Patent Application No. 62/926,165 entitled COORDINATING MULTIPLE ROBOTS TO MEET WORKFLOW AND AVOID CONFLICT filed Oct. 25, 2019 which is incorporated herein by reference for all purposes, and claims priority to U.S. Provisional Patent Application No. 62/993,579 entitled SINGULATION OF ARBITRARY MIXED ITEMS filed Mar. 23, 2020 which is incorporated herein by reference for all purposes.

BACKGROUND OF THE INVENTION

Parcel and other distributions centers may receive an arbitrary mix of items of various sizes, dimensions, shape, weight, rigidity, and/or other attributes, often in a cluttered arbitrary mix. Each item may have machine readable information, such as text and/or optically or otherwise encoded information, which can be machine read and used to route the item, e.g., via an automated sorting/routing system and/or processing. To read the information for a given item, in a typical approach the items are separated from one another via a process known as "singulation".

Typically, singulation has been performed manually by human workers. A mixed of items arrives at a work station, e.g., via a chute or other conveyance, and each of a set of one or more human workers manually separates items and placed them in a defined space for a single item on a conveyor belt or the like. For each item, its destination (or at least next leg of transport) is determined by machine-reading information on the item, and the item is routed to a destination associated with the next leg, such as a bag, bin, container, or other receptacle and/or a delivery vehicle or staging area associated with the next leg.

Manual singulation processes are labor-intensive and can be inefficient. For example, a downstream human worker may have few locations on which to place singulated items, e.g., as a result of upstream workers filling many of the single item spots. Collective throughput may be suboptimal.

Use of robots to perform singulation is challenging due to the arrival of a cluttered mix of items at a work station, the dynamic flow of items at each station and overall, and the result that it may be difficult to identify, grasp, and separate (singulate) items using a robotic arm and end effector in an automated manner.

BRIEF DESCRIPTION OF THE DRAWINGS

Various embodiments of the invention are disclosed in the following detailed description and the accompanying drawings.

FIGS. 6A through 6C illustrate an example of item flow through a feeder chute in an embodiment of a robotic singulation system.

FIGS. 6D through 6F illustrate an example of item flow through a feeder chute in an embodiment of a robotic singulation system.

DETAILED DESCRIPTION

Figure 1:
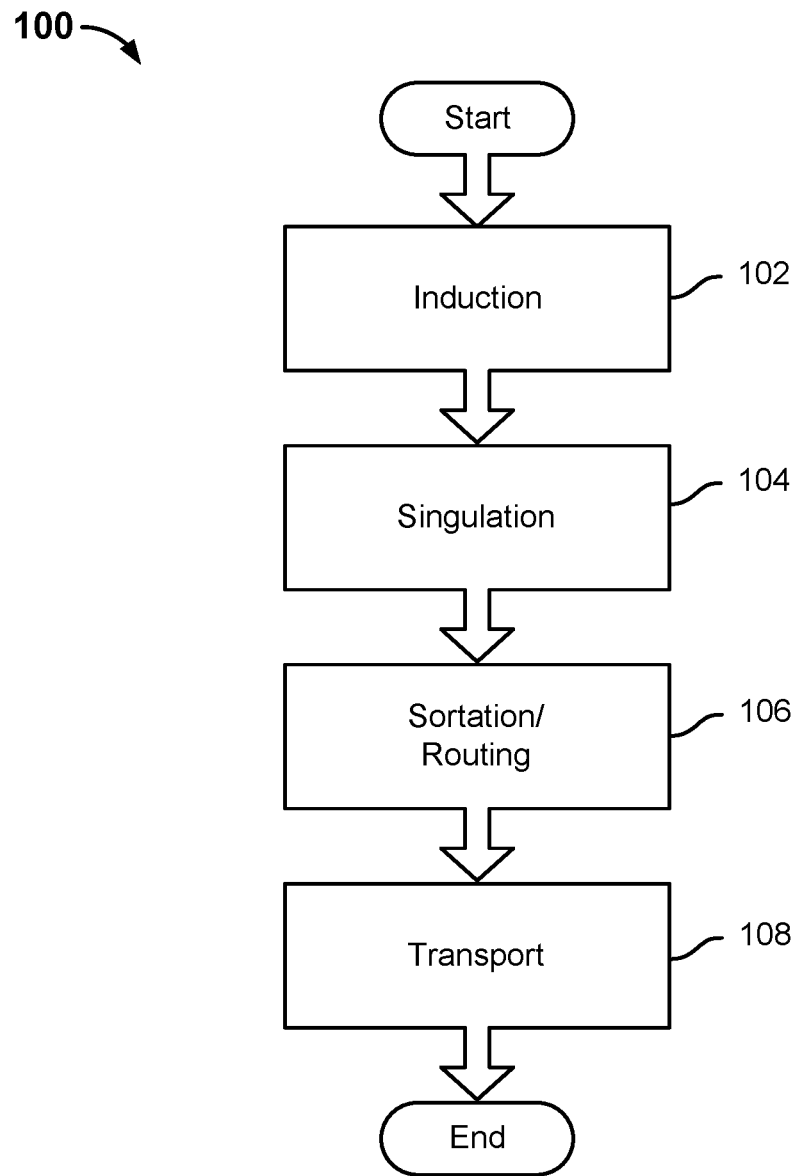
FIG. 1 is a flow diagram illustrating an embodiment of a process to receive, sort, and transport items for distribution and delivery.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic system to perform singulation and/or sortation is disclosed. In various embodiments, a robotic system includes a robotic arm and end effector used to pick items from a source pile/flow and place them on a segmented conveyor or similar conveyance to be sorted and routed for transport to a downstream (e.g., ultimate addressed/physical) destination. In some embodiments, multiple robots are coordinated to maximize collective throughput. In various embodiments, one or more robots may be employed at a singulation station. A system may include multiple stations. Human workers may be employed at one or more stations. The robotic system in various embodiments may be configured to invoke (request) the assistance of a human worker, e.g., by teleoperation of a robotic arm, manual task completion, etc., for example to handle an item the robot cannot handle by fully automated processing and/or an item the robot has dropped, etc.

A robotic singulation system that models item flow through a chute or other source receptacle and uses the model to pick items from a (sometimes and/or potentially) flowing pile of items of mixed size, weight, shape, packaging, rigidity, and/or other dissimilar attribute(s) and places the items singly each in a corresponding location in a singulation conveyance, such as a segmented conveyor, is disclosed. In various embodiments, the model is used to anticipate a location of an item and grasp the item at the location. A robotic arm or other structure may be moved out of the way at a designated time, based on the model, to ensure a clear view of the item to be grasped. The robotic system may be wait, e.g., for a prescribed interval, based on the model and/or other information indicating an unstable flow and/or other flow characteristics suggesting a successful grasp is not possible or likely to be successful under current item flow conditions. In some embodiments, the model of item flow may be used to grasp two or more items in succession, each from a location predicted or otherwise determined based at least in part on the model, without fully recomputing a three dimensional or other view of the workspace between grasps.

Parcel carriers, postal services, delivery services, large retailers or distributors, and other enterprise and government entities that handle, transport, and deliver items to and from diverse locations typically receive large quantities of items from various source locations, each to be delivered to a corresponding one of a variety of destination locations.

Machines exist to handle, sort, and route items, but to use machine readers and sorting equipment items may need to be spaced from one another and/or in a certain orientation to be able to have a label or tag read by a machine. Such spacing and orientation may need to be achieve in the course of a process of "induction" of items into a sorting/routing facility, and may be performed in connection with a "sorting" or "sortation" process, for example a process by which items to be delivered to diverse locations are sorted by general destination (e.g., region, state, city, zip code, street, by street number order, etc.).

Machine readers, such as radio-frequency (RF) tag readers, optical code readers, etc., may need items to be space apart from one another, a process sometimes referred to as "singulation", to be able to reliably read a tag or code and for the system to associate the resulting information with a specific item, such as an item in a specific location on a conveyor or other structure or instrumentality.

In a typical induction/sortation process in a parcel sorting operation, for example, individual parcels may be picked from bulk piles and placed onto a moving conveyor or tilt tray sortation system. For most facilities, induction of this type is entirely manual.

A typical, manual parcel induction/sortation process may include one or more of the following:

A chute with unsorted parcels filters down onto a sorting table adjacent to a conveyor-based sortation system A worker's job is to "singulate" the items onto the conveyor or tray-based sortation system Workers ensure that every parcel which is inducted onto the sorter is oriented such that a shipping barcode (or other optical code, electronic tag, etc.) can be read for sortation purposes (this orientation typically is determined by the scanning infrastructure at the facility)

Wait for an empty tray or slot to pass, and ensure that only one parcel is placed on each slot or tray In a typical manual induction/sortation process, manually (or machine) fed chutes via which parcels of a variety of shapes and sizes arrive in bulk in various orientations; parcels may have different dimensions, shapes, rigidity, packaging, etc.; typically human workers take packages from a chute feeding a station at which each works and places them one by one on an open partitioned or otherwise defined segment of a conveyor; finally, many workers each at a station populate locations on one or more conveyors with singulated parcels, to facilitate downstream machine processing, such as reading the code or tag and taking automated sorting action based thereon, such as routing each parcel to a location within the facility that is associated with a destination to which the parcel is to be delivered. The location may involve further sorting (e.g., more destination-specific location within the facility) and/or packing/loading the parcel for further shipment (e.g., truck or aircraft to further destination where further sorting and delivery will occur, loading on a truck for local delivery, etc.).

FIG. 1 is a flow diagram illustrating an embodiment of a process to receive, sort, and transport items for distribution and delivery. In the example shown, process 100 begins with an induction process 102 by which items are provided to one or more workstations for singulation via singulation process 104. In various embodiments, the singulation process 104 is at least partly automated by a robotic singulation system as disclosed herein. The singulation process 104 receives piles or flows of dissimilar items via induction process 102 and provides a stream of singulated items to a sortation/routing process 106. For example, the singulation process 104 may place items one by one on a segmented conveyor or other structure that feeds items one by one into a sortation/routing machine. In some embodiments, items are placed with an orientation such that a label or tag is able to be read by a downstream reader configured to read routing (e.g., destination address) information and use the routing information to sort the item to a corresponding destination, such as a pile, bin, or other set of items destined for the same next intermediate and/or final destination. Once sorted, groups of items heading to a common next/final destination are processed by a transport process 108. For example, items may be placed in containers, loaded into delivery or transport trucks or other vehicles, etc., for delivery to the next/final destination.

Figure 2A:
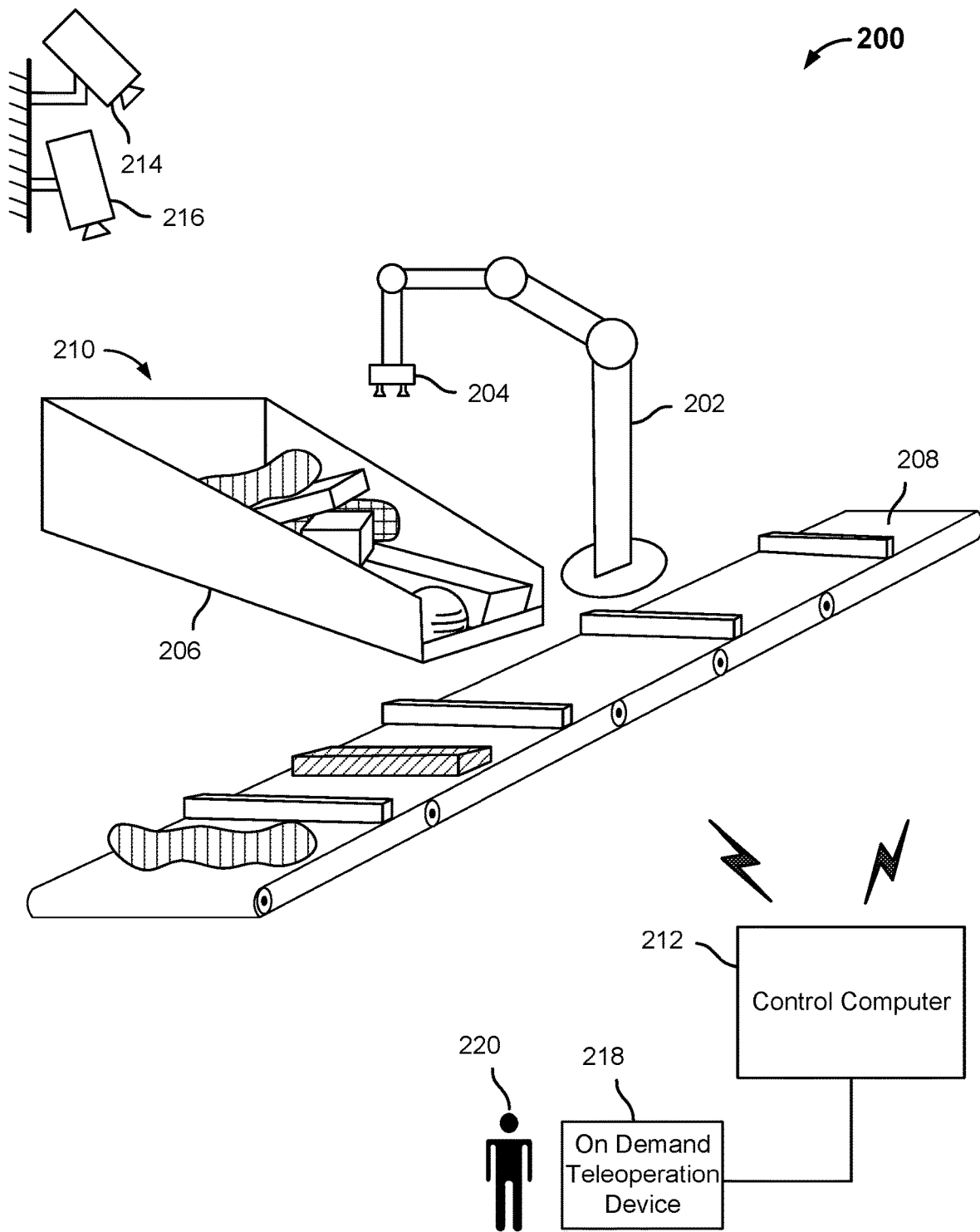
FIG. 2A is a diagram illustrating an embodiment of a robotic singulation system.

FIG. 2A is a diagram illustrating an embodiment of a robotic singulation system. In various embodiments, the singulation process 104 of FIG. 1 is performed at least in part by a robotic singulation system such as system 200 of FIG. 2A.

In various embodiments, a robotic system comprising one or more robotic arms performs singulation/induction. In the example shown in FIG. 2A, system 200 includes a robotic arm 202 equipped with a suction-based end effector 204. While in the example shown the end effector 204 is a suction-based end effector, in various embodiments one or more other types of end effector may be used in a singulation system as disclosed herein, including without limitation a pinch-based end effector or other types of actuated grippers. In various embodiments, the end effector may be actuated by one or more of suction, air pressure, pneumatics, hydraulics, or other actuation. The robotic arm 202 and 204 are configured to be used to retrieve parcels or other items that arrive via chute or bin 206 and place each item in a corresponding location on segmented conveyor 208. In this example, items are fed into chute 206 from an intake end 210. For example, one or more human and/or robotic workers may feed items into intake end 210 of chute 206, either directly or via a conveyor or other electro-mechanical structure configured to feed items into chute 206.

In the example shown, one or more of robotic arm 202, end effector 204, and conveyor 208 are operated in coordination by control computer 212. In various embodiments, control computer 212 includes a vision system used to discern individual items and each item's orientation based on image data provided by image sensors, including in this example 3D cameras 214 and 216. The vision system produces output used by the robotic system to determine strategies to grasp the individual items and place each in a corresponding available defined location for machine identification and sorting, such as a partitioned section of segmented conveyor 208.

In various embodiments, a robotic system as disclosed herein includes and/or does one or more of the following, e.g., by operation of a control computer such as control computer 212:

Computer vision information is generated by merging data from multiple sensors, including one or more of 2D cameras, 3D (e.g., RGBD) cameras, infrared, and other sensors to generate a three-dimensional view of a workspace that includes one or more sorting stations.

Robotic system coordinates operation of multiple robots to avoid collisions, getting in each other's way, and contending to pick up the same item and/or place an item in the same destination location (e.g., segmented part of the conveyor) as another robot.

Robotic system coordinates operation of multiple robots to ensure all items are placed and only one per slot/location. For example, if robot A drops an item system tasks robot B to pick it up; item placed but with improper orientation is picked up and adjusted or moved to another location by same or another robot; two or more items in a single destination slot results in robot downstream station picking one of them off conveyor and placing in own location; etc.

System continuously updates motion planning for each robot and all of them together to maximize collective throughput.

In the event two robots independently are tasked to acquire the same item, the system picks one at random to get that item and the other moves on to the next item (e.g., identify, select, determine grasp strategy, pick, move according to plan, and place).

Conveyor movement and/or speed controlled as needed to avoid empty locations and maximize robot productivity (throughput) In the event an item is misplaced or dropped, the system assigns a robot or, if needed, a human worker to pick it up and place back in the retrieving robot's own source pile or, if available or more optimal, on a next open slot on the conveyor.

Upstream robots controlled to intentionally leave some slots open for downstream robots to place items on the conveyor.

Failure that cannot be corrected by same or another robot results in alert to obtain human (or other robotic) intervention to resolve.

In various embodiments, an arbitrary mix of items to be singulated may include parcels, packages, and/or letters of a variety of shapes and sizes. Some may be standard packages one or more attributes of which may be known, others may be unknown. Image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used to grasp and move one or more items.

The multiple cameras serve many purposes, in various embodiments. First they provide a richer full 3D view into the scene. Next they operate in cohesion to minimize the errors due to package shininess when light reflecting off a package and into a camera may disrupt its operation; in this case another camera at a different location provides a backup. In some embodiments, they can be selectively triggered by a predictive vision algorithm that determines which camera has the best viewing angle and/or lowest error rate for picking a particular package; as such each package has the optimal camera looking at it. In some embodiments, one or more cameras are mounted on an actuated base, of which the system can change the position and orientation to provide a more optimal perception (e.g., view) of a package.

Another purpose served by cameras is to detect any sort of unforeseen error in robot operation or any disruption to the environment. Cameras placed on the robot and on the environment have different error and accuracy profiles. The cameras on the robot can be more accurate since they are rigidly fixed to the robot but slower to use since using them requires the robot to slow down or stall. Cameras in the environment have a stable view and are effectively faster since the robot can multi-task and do something else while a camera is taking a photo. But if someone moves or shakes the camera stand, they would be out of sync with the robot and cause a lot of errors. Combining images from robot and non-robot cameras (occasionally or on a package miss) enables detecting if the robot is in sync with non-robot cameras, in which case the robot can take corrective action and be more robust. In some embodiments, a camera may not be mounted rigidly on a robotic arm, and in some such embodiments gyros and/or accelerometers on the cameras may be used to filter or compensate for the motion of the mounting base.

Referring further to FIG. 2A, in the example shown system 200 further includes an on demand teleoperation device 218 usable by a human worker 220 to operate one or more of robotic arm 202, end effector 204, and conveyor 208 by teleoperation. In some embodiments, control computer 212 is configured to attempt to grasp and place items in a fully automated mode. However, if after attempting to operate in fully automated mode control computer 212 determines it has no (further) strategies available to grasp one or more items, in various embodiments control computer 212 sends an alert to obtain assistance from a human operator via teleoperation, e.g., by human operator 220 using teleoperation device 218. In various embodiments, control computer 212 uses image data from cameras such as cameras 214 and 216 to provide a visual display of the scene to human worker 220 to facilitate teleoperation. For example, control computer 212 may display a view of the pile of items in chute 206. In some embodiments, segmentation processing is performed by control computer 212 on image data generated by cameras 214 and 216 to discern item/object boundaries. Masking techniques may be used to highlight individual items, e.g., using different colors. The operator 220 may use the visual display of the scene to identify the item(s) to be grasped and use teleoperation device 218 to control the robotic arm 202 and end effector 204 to pick the item(s) from chute 206 and place each in a corresponding location on conveyor 208. In various embodiments, once the item(s) for which human intervention was prompted have been placed on the conveyor, the system 200 resume fully automated operation. In various embodiments, in the event of human intervention, the robotic system observes the human worker (e.g., manual task completion, task completion using a robotic arm and end effector via teleoperation) and attempts to learn a strategy to (better) complete the task in an autonomous mode in future. For example, the system may learn a strategy to grasp an item, e.g., by observing the places on the item at which a human worker grasps the item and/or by remembering how the human worker used the robotic arm and end effector to grasp the item via teleoperation.

Figure 2B:
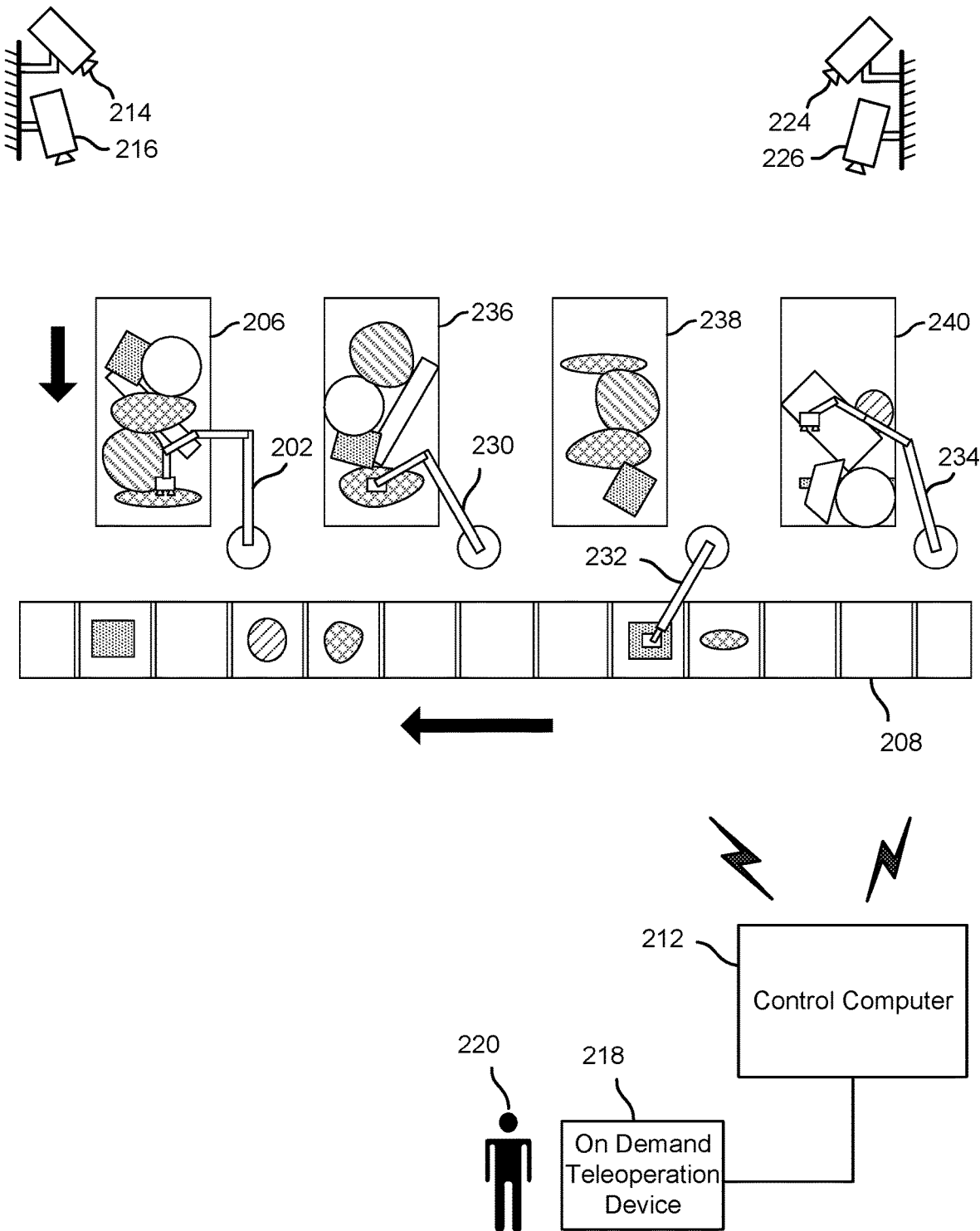
FIG. 2B is a diagram illustrating an embodiment of a multi-station robotic singulation system.

FIG. 2B is a diagram illustrating an embodiment of a multi-station robotic singulation system. In the example shown, the robotic singulation system of FIG. 2A has been expanded to include a plurality of singulation stations. Specifically, in addition to robotic arm 202 configured to pick items from chute 206 and place each item on a corresponding available and/or assigned location on segmented conveyor 208, the system shown in FIG. 2B includes three additional stations: robotic arms 230, 232, and 234 positioned and configured to pick/place items from chutes 236, 238, and 240, respectively. Additional cameras 224 and 226 are included, in addition to cameras 214 and 216, to provide a 3D view of the full scene, including each of the four stations/chutes 206, 236, 238, and 240, as well as conveyor 208.

In various embodiments, control computer 212 coordinates operation of the four robotic arms 202, 236, 238, and 240 and associated end effectors, along with conveyor 208, to pick/place items from the chutes 206, 236, 238, and 240 to conveyor 208 in a manner that maximizes the collective throughput of the system.

While in the example shown in FIG. 2B each station has one robotic arm, in various embodiments two or more robots may be deployed at a station, operated under control of an associated control computer, such as control computer 212 in the example shown in FIG. 2B, in a manner that avoids the robots interfering with each other's operation and movement and which maximizes their collective throughput, including by avoiding and/or managing contention to pick and place the same item.

In various embodiments, a scheduler coordinates operation of a plurality of robots, e.g., one or more robots working at each of a plurality of stations, to achieve desired throughput without conflict between robots, such as one robot placing an item in a location the scheduler has assigned to another robot.

In various embodiments, a robotic system as disclosed herein coordinates operation of multiple robots to one by one pick items from a source bin or chute and place them on an assigned location on a conveyor or other device to move items to the next stage of machine identification and/or sorting.

In some embodiments, multiple robots may pick from a same chute or other source receptacle. In the example shown in FIG. 2B, for example, robotic arm 202 may be configured to pick from either chute 206 or chute 236. Likewise, robotic arm 230 may pick from chute 236 or chute 238 and robotic arm 232 may pick from chute 238 or chute 240. In some embodiments, two or more robotic arms configured to pick from the same chute may have different end effectors. A robotic singulation system as disclosed herein may select the robotic arm most suitable to pick and singulate a given item. For example, the system determines which robotic arms can reach the item and selects one with the most appropriate end effector and/or other attributes to successfully grasp the item.

While stationary robotic arms are shown in FIG. 2B, in various embodiments one or more robots may be mounted on a mobile conveyance, such as a robotic arm mounted on a chassis configured to be moved along a rail, track, or other guide, or a robotic arm mounted on a mobile cart of chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

Figure 3A:
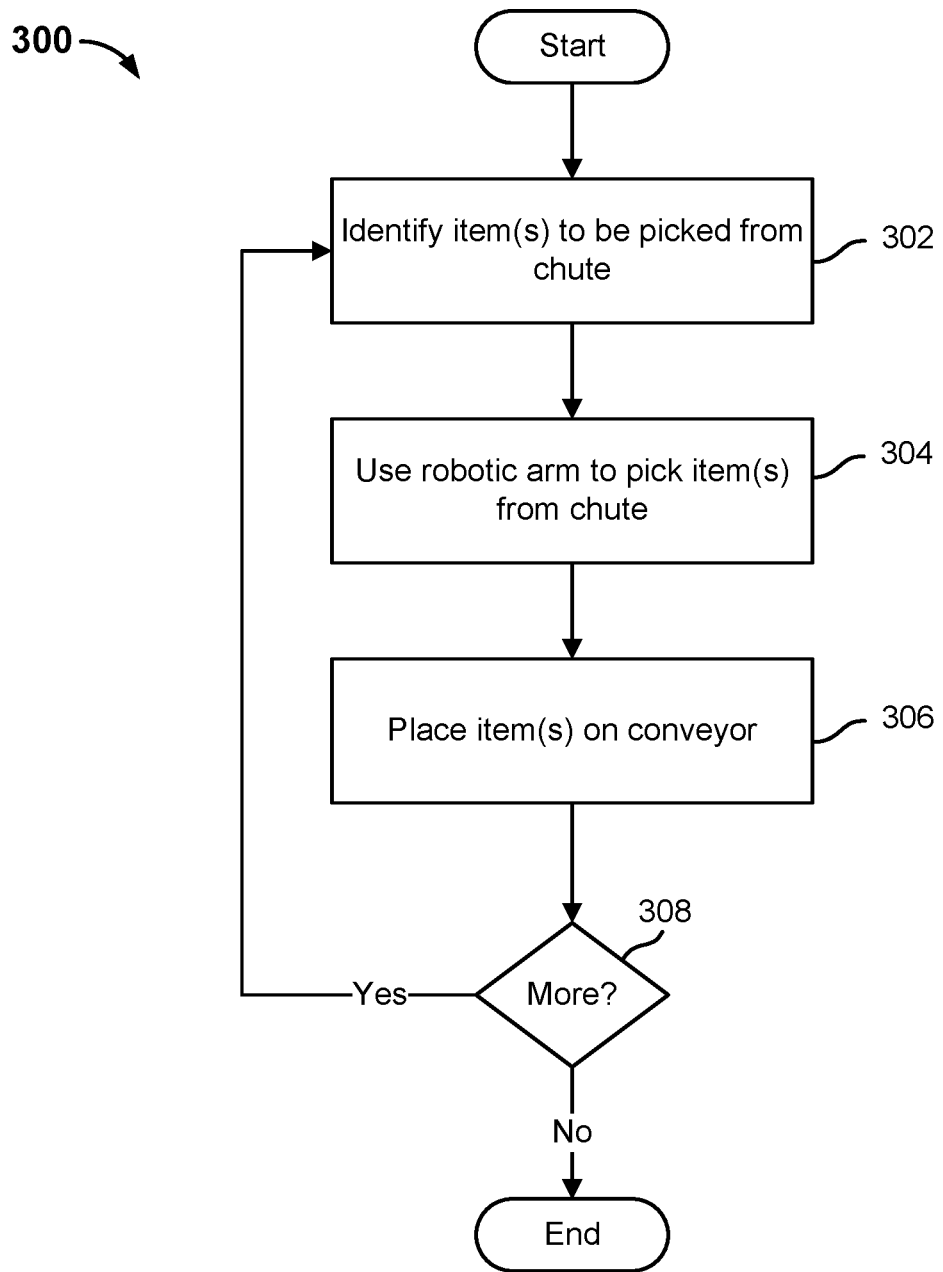
FIG. 3A is a flow chart illustrating an embodiment of a process to pick and place items for sorting.

FIG. 3A is a flow chart illustrating an embodiment of a process to pick and place items for sorting. In various embodiments, process 300 of FIG. 3A is performed by a control computer, such as control computer 212 of FIGS. 2A and 2B. In the example shown, at 302 items to be picked from a chute or other source or receptacle via which items are received at a singulation station are identified. In some embodiments, image data from one or more cameras is used, e.g., by a vision system or module comprising a control computer, to generate a 3D view of the pile or flow of items. Segmentation processing is performed to determine item boundaries and orientation. At 304, a robotic arm is used to pick items from the chute. Items may be picked one at a time or, in some embodiments, multiple items may be grasped at once. At 306, the grasped item(s) is/are moved each to a corresponding spot on a segmented conveyor. If there are more items, a further iteration of steps 302, 304, and 306 is performed, and successive iterations are performed until it is determined at 308 that there are no more items in the chute (or other receptacle or source) to be picked and placed.

Figure 3B:
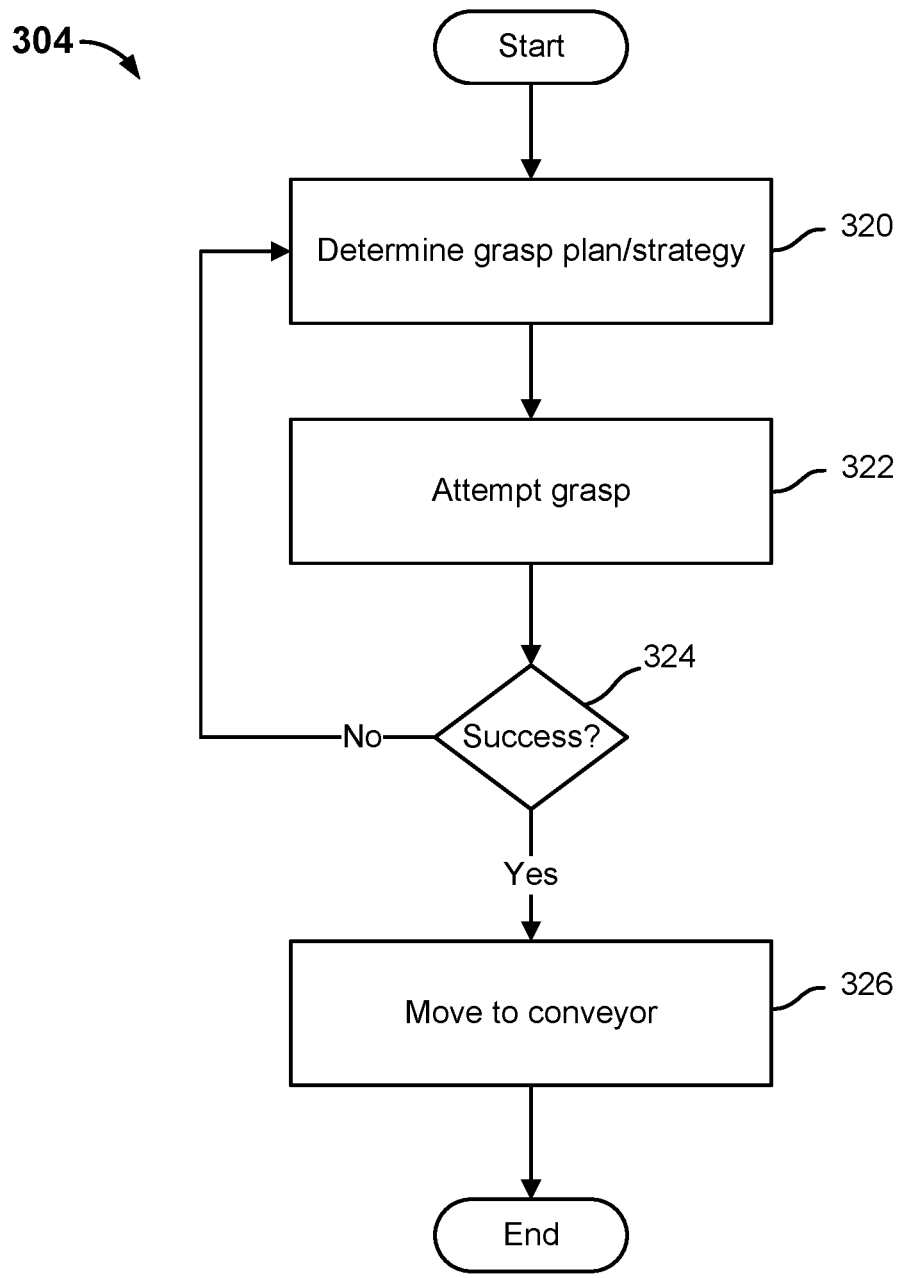
FIG. 3B is a flow chart illustrating an embodiment of a process to pick and place an item for sorting.

FIG. 3B is a flow chart illustrating an embodiment of a process to pick and place an item for sorting. In various embodiments, the process of FIG. 3B implements step 304 of the process 300 of FIG. 3A. In the example shown, at 320 a plan and/or strategy to grasp one or more items is determined. In various embodiments, the plan/strategy is determined based at least in part on one or more of image data, e.g., indicating the size, extent, and orientation of an item, and attributes that may be known, determined, and/or inferred about the item, such as by classifying the item by size and/or item type. For example, in the context of a parcel delivery service, certain standard packaging may be used. A range of weights or other information may be known about each standard package type. In addition, in some embodiments, strategies to grasp items may be learned over time, e.g., by the system noting and recording the success or failure of prior attempts to grasp a similar item (e.g., same standard item/packaging type; similar shape, rigidity, dimensions; same or similar shape; same or similar material; position and orientation relative to other items in pile; the extent of item overlap; etc.)

At 322, the system attempts to grasp one or more items using the strategy determined at 320. For example, the end effector of a robotic arm may be moved to a position adjacent to the item(s) to be grasped, according to the determined strategy, and the end effector may be operated according to the determined strategy to attempt to grasp the item(s).

At 324 a determination is made as to whether the grasp was successful. For example, image data and/or force (weight), pressure, proximity, and/or other sensor data may be used to determine whether the item was grasped successfully. If so, at 326 the item(s) is/are moved to the conveyor. If not, processing returns to step 320, at which a new strategy to grasp the item is determined (if available).

In some embodiments, if after a prescribed and/or configured number of attempts the system fails to grasp an item, or if the system cannot determine a further strategy to grasp the item, the system moves on to identify and grasp another item, if available, and/or sends an alert to obtain assistance, such as from a human worker.

Figure 4A:
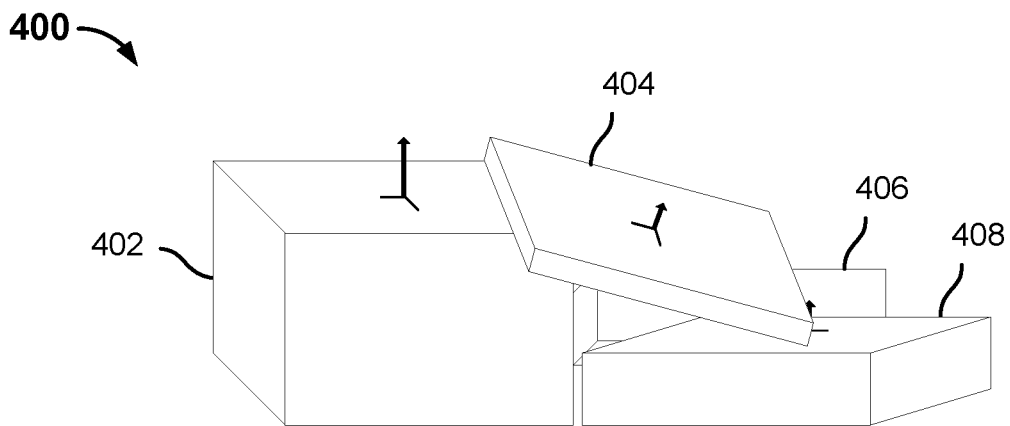
FIG. 4A is a diagram illustrating normal vector computation and display in an embodiment of a robotic singulation system.

FIG. 4A is a diagram illustrating normal vector computation and display in an embodiment of a robotic singulation system. In various embodiments, item boundaries and normal vectors are determined and a visualization of the item boundaries and normal vectors is generated and displayed by a control computer comprising a robotic singulation system as disclosed herein, such as control computer 212 of FIGS. 2A and 2B.

In the example shown, 3D scene visualization 400 comprises the output of a vision system as implemented in various embodiments. In this example, normal vectors to item surfaces are shown. Normal vectors are used in some embodiments to determine a strategy to grasp an item. For example, in some embodiments, the robot has a suction-type end effector and the normal vectors are used to determine an angle and/or orientation of the end effector to maximize the likelihood of a successful grasp using suction.

In some embodiments, the vision system is used to discern and distinguish items by object type. The object type may be indicated in visualization 400 by highlighting each object in a color corresponding to its type. In some embodiments, object type information is or may be used to determine and/or modify a grasp strategy for the item, such as by increasing suction pressure or grasp force, reducing movement speed, using a robot with a particular required end effector, weight capacity, etc.

In some embodiments, additional information not shown in FIG. 4A may be displayed. For example, in some embodiments, for each item a best grasp strategy and associated probability of grasp success are determined and displayed adjacent to the item. The displayed information may be used, in some embodiments, to monitor system operation in a fully automated mode of operation and/or to enable a human operator to intervene and quickly gain a view of the scene and available grasp strategies and probabilities, e.g., to operate the robotic singulation system by teleoperation.

Figure 4B:
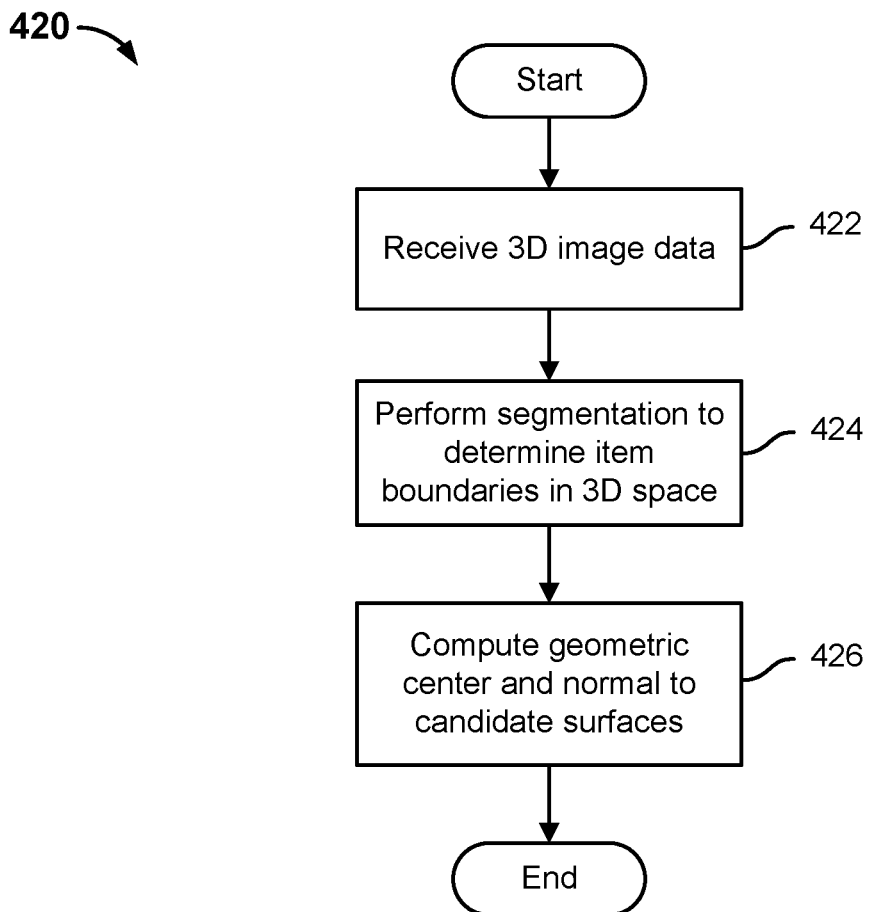
FIG. 4B is a flow chart illustrating an embodiment of a process to process image data to identify and compute normal vectors for items.

FIG. 4B is a flow chart illustrating an embodiment of a process to process image data to identify and compute normal vectors for items. In various embodiments, process 420 may be performed to generate and display a visual representation of a 3D view of a scene, such as visualization 400 of FIG. 4A. In various embodiments, the process 420 is performed by a computer, such as control computer 212 of FIGS. 2A and 2B.

In the example shown, at 422 3D image data is received from one or more cameras, such as cameras 214, 216, 224, and/or 226 of FIGS. 2A and 2B, cameras mounted on the robotic arms and/or end effectors, etc. In various embodiments, image data from multiple cameras is merged to generate a composite 3D view of the scene, such as a pile or flow of items from which items are to be picked. At 424, segmentation processing is performed to determine item boundaries in 3D space. At 426, for each item for which a sufficient and sufficiently unobscured view has been obtained a geometric center and normal vector of each of one or more surfaces of the item, e.g., a largest and/or most exposed (not obscured, e.g. by other item overlap) surface of the item, is determined.

In various embodiments, the segmentation data determined at 424 is used to generate for each of a plurality of items a corresponding mask layer. The respective mask layers are used in various embodiments to generate and display a visual representation of the scene in which the respective items are highlighted. In various embodiments, each item is highlighted in a color corresponding to an object type and/or other attribute (weight, class, softness, deformability, unpickability—e.g., broken package, porous surfaces, etc.) of the item.

Figure 5A:
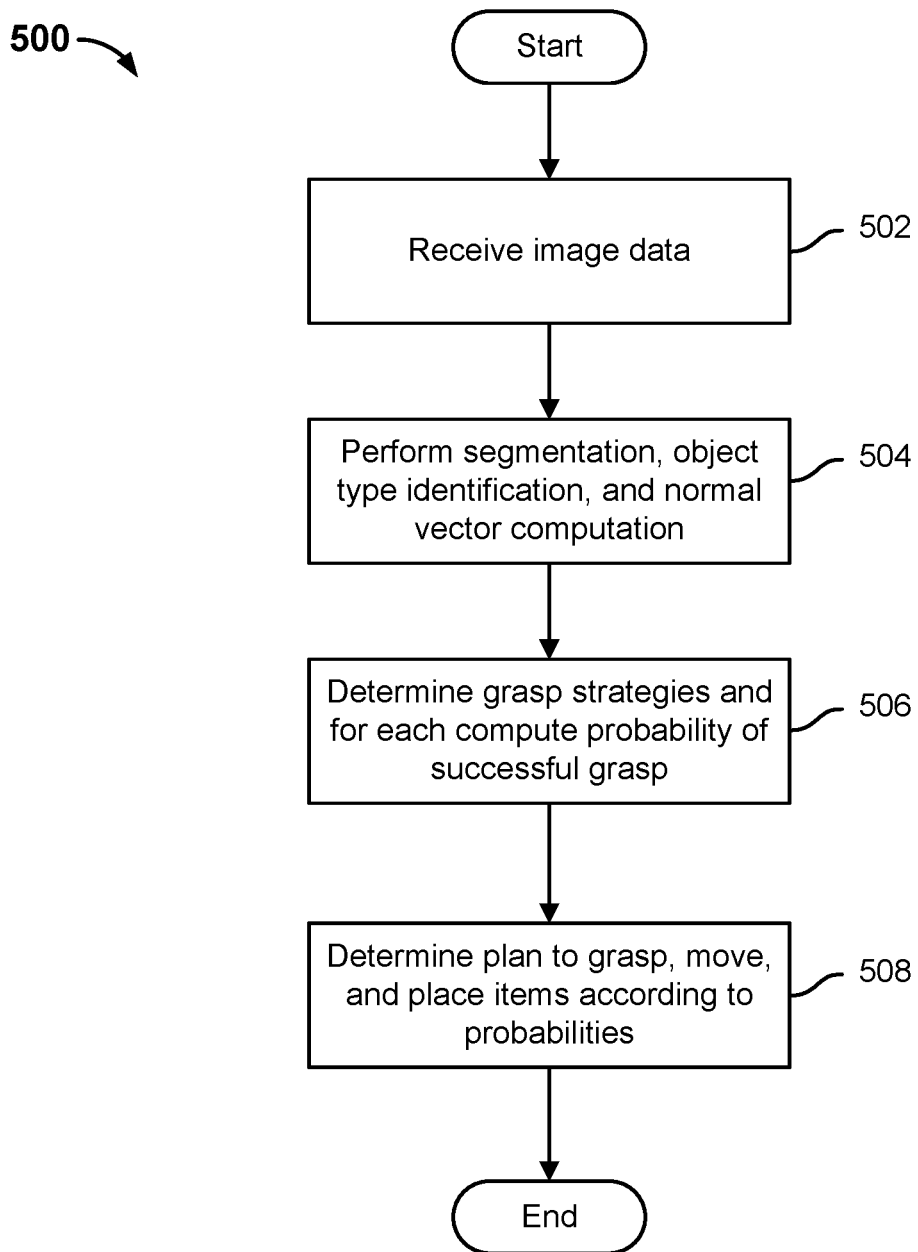
FIG. 5A is a flow chart illustrating an embodiment of a process to use image data to determine a plan to pick and place items.

FIG. 5A is a flow chart illustrating an embodiment of a process to use image data to determine a plan to pick and place items. In various embodiments, process 500 of FIG. 5A is implemented by a computer, such as control computer 212 of FIGS. 2A and 2B.

In the example shown, at 502 image data is received. Image data may be received from a plurality of cameras, including one or more 3D cameras. Image data may be merged to generate a 3D view of the workspace, such as a pile or flow of items in a chute or other receptacle. At 504, segmentation, object type identification, and normal vector computation are performed. In some embodiments, segmentation data is used to discern item boundaries and generate item-specific mask layers, as described above.

At 506, grasp strategies are determined for as many items as possible given the current view of the workspace. For each item, one or more grasp strategies may be determined, and for each strategy a probability that the strategy will result in a successful grasp of the item is determined. In some embodiments, a grasp strategy is determined based on item attributes, such as item type, size, estimated weight, etc. In some embodiments, determining a grasp strategy includes determining whether to attempt to pick up one item or multiple items, whether to use all end effector actuators (e.g., use just one or two or more suction cups or sets of cups) and/or selecting a combined grasp technique and corresponding speed from a set of computed grasp technique+ speed combinations under consideration (e.g., 1 suction cup @ 50% speed vs. 2 suction cups 80% speed). For example, in some embodiments, a determination may be made based on package type to use one suction cup at 50% speed, such as to grasp a smaller item (can't use two suction cups) that may be heavy or difficult to grasp securely with one suction cup (move 50% speed instead of 80%, so as not to drop). A larger item that is also relatively light or easier to grasp securely with two suction cups, by contrast, may be grasped with two cups and moved more quickly.

In some embodiments, the grasp strategy may change if the object is moving as part of a flowing pile. For example, according to one strategy the robot may push down on the object harder to freeze it in place while the suction cups can be independently activated in the order in which they touch the package to ensure a tight and stable grasp. The robot will also match speed, based on visual or depth sensor feedback, with the flowing pile to ensure that the package doesn't slip by in the pile.

Another optimization implemented in some embodiments is to change grasp strategy based on double (or n-) item picking (also see next section) where a robot may adapt its strategy based on whether it's trying to reuse vision data while picking multiple items in a batch or sequentially. For example, a robot gripper with 4 suction cups can use 2 cups to pick up one object, and the others 2 to pick up a second object. In this scenario, the robot would lower its speed and would also approach the grasp for the second object in a manner that avoids collisions between the already held first object and the surrounding pile of objects.

At 508, the item-specific grasp strategies and probabilities determined at 506 are used to determine a plan to grasp, move, and place items according to the probabilities. For example, a plan to grasp the next n items in a specific order, each according to the grasp strategies and corresponding probabilities of success determined for that item and strategy, may be determined.

In some embodiments, changes in the location, arrangement, orientation, and/or flow of items resulting from the grasping and removal of earlier-grasped items is taken into consideration in formulating a plan, at 508, to grasp multiple items in succession.

In various embodiments, the process 500 of FIG. 5 is a continuous and ongoing process. As items are picked and placed from the pile, subsequently received image data is processed to identify and determine strategies to grasp more items (502, 504, and 506), and a plan to pick/place items is updated based on the grasp strategies and probabilities (508).

Figure 5B:
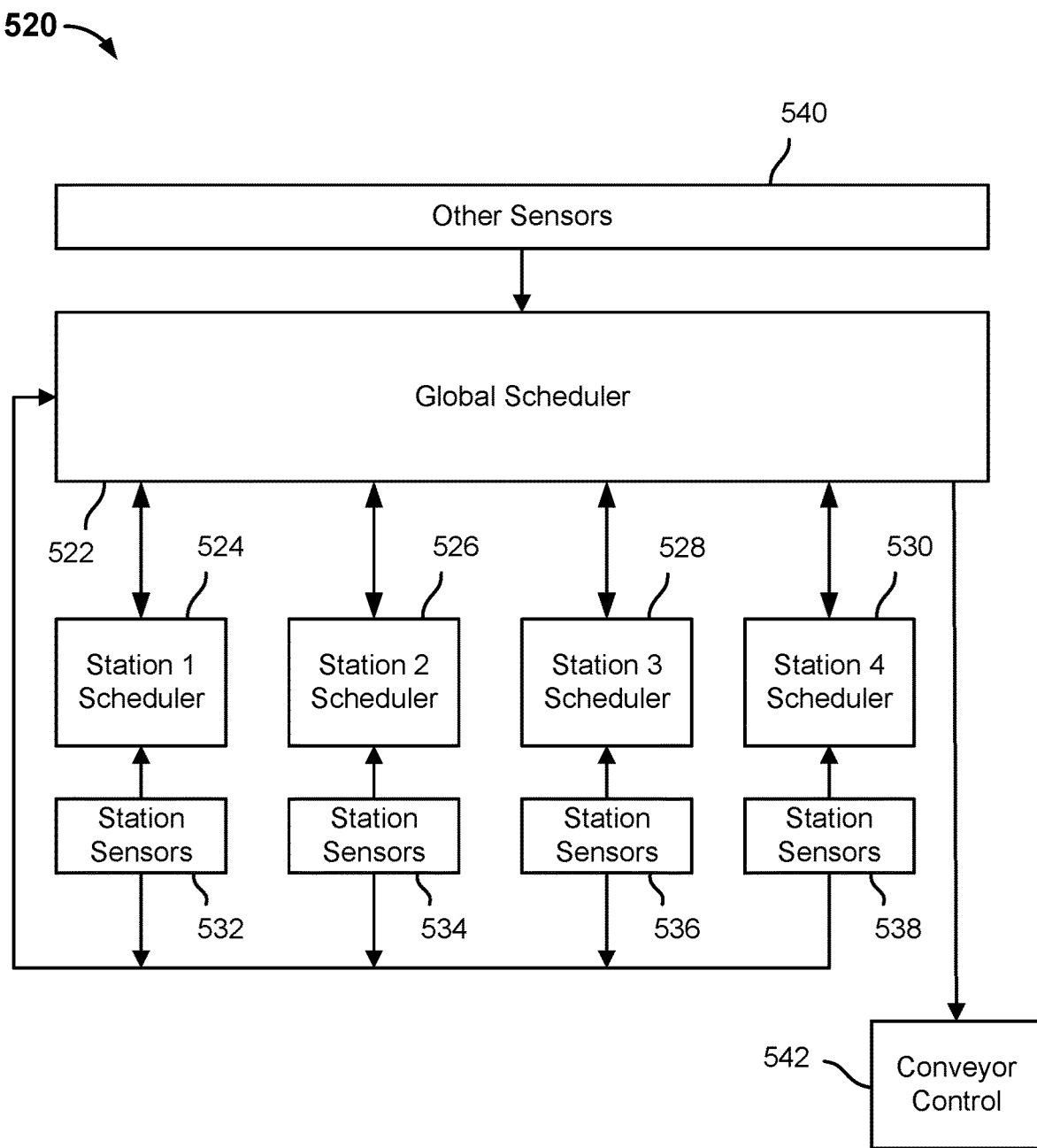
FIG. 5B is a block diagram illustrating an embodiment of a hierarchical scheduling system in an embodiment of a robotic singulation system.

FIG. 5B is a block diagram illustrating an embodiment of a hierarchical scheduling system in an embodiment of a robotic singulation system. In various embodiments, the hierarchical scheduling system 520 of FIG. 5B is implemented at least in part on a computer, such as control computer 212 of FIGS. 2A and 2B. In the example shown, hierarchical scheduling system 520 includes a global scheduler 522 configured to optimize throughput by coordinating the operation of a plurality of robotic singulation stations and a segmented conveyor (or similar structure) on which the robotic singulation stations are configured to place items. Global scheduler 522 may be implemented as a processing module or other software entity running on a computer. The global scheduler supervises and coordinates work among the robotic singulation stations at least in part by monitoring and as needed controlling and/or otherwise providing input to a plurality of robotic singulation station schedulers 524, 526, 528, and 530.

Each of the robotic singulation station schedulers 524, 526, 528, and 530 is associated with a corresponding robotic singulation station and each controls and coordinates the operation of one or more robotic arms and associated end effectors to pick items from a corresponding chute or other item receptacle and place them singly on a segmented conveyor or similar structure. Each of the robotic singulation station schedulers 524, 526, 528, and 530 is associated with a corresponding set of one or more station sensors 532, 534, 536, and 538, respectively, and each uses the sensor data generated by its station's sensors to perform automated singulation at its robotic singulation station. In some embodiments, each implements and performs process 500 of FIG. 5A.

In various embodiments, each of the robotic singulation station schedulers 524, 526, 528, and 530 reports to global scheduler 522 one or more of image and/or other station sensor data; object identification, grasp strategy, and success probability data; pick/place plan information; and expected item singulation throughput information. Global schedule 522 is configured to use information received from the robotic singulation station schedulers 524, 526, 528, and 530—along with sensor data received from other sensors 540, such as cameras pointed at the segmented conveyor and/or other parts of the workspace not covered or covered well or completely by the station sensors—to coordinate work by the respective robotic singulation stations, each under the control of its station-specific scheduler 524, 526, 528, or 530, and to control the operation (e.g., speed) of the segmented conveyor via conveyor controller 542, so as to optimize (e.g., maximize) the collective singulation throughput of the system.

In various embodiments, the global scheduler 522 employs one or more techniques to optimize the use of a plurality of robots comprising the robotic singulation system to perform singulation, e.g., to maximize overall throughput. For example, if there are four robots in sequence, the lead (or other upstream) robot may be controlled to place packages in a manner that leaves open slots so that a downstream robot isn't waiting for an empty slot. This approach has impacts because downstream robots wait for some unknown/random amount of time because of package flow etc. As a result, a naive strategy (say lead robot places into every 4th slot empty) may not optimize collective throughput. Sometimes it might be better for the lead robot to put 2-3 packages into successive slots in sequence if its packages aren't flowing, but overall the system makes such decisions with awareness of state and flow at each station. In some embodiments, the optimal strategy for leaving open slots for downstream robots is based on an anticipated request for an open slot by the downstream robot (as a function of their package flow, for example). In some embodiments, information from the local station scheduler is used to anticipate the maximum throughput of each station and to control conveyor speeds and how many slots are left empty by upstream robots to ensure downstream robots have access to empty slots in proportion to the speed at which they are (currently) able to pick/place. In some embodiments, when the segmented conveyor is full due to some bottlenecks in the downstream sortation process, a robotic singulation system as disclosed herein may pre-singulate one or more packages, for example inside its corresponding chute or in a nearby staging area, while keeping tracking of the poses of each pre-singulated package. Once some empty spaces are available from the segmented conveyor, the system/station moves the pre-singulated packages onto the segmented conveyor, singly and in rapid succession, without additional vision processing time.

In some embodiments, the presence of humans working alongside robots has an impact on the placement and multi-robot coordination strategy since the robots or associated computer vision or other sensor system must now also watch what humans do and adapt the robot's placements in real-time. For example, if a human took over a conveyor belt slot that was scheduled to be used by a robot, the system must adjust its global and local schedules/plans accordingly. In another example, if a human disrupts a robot's picked package and causes it to register as not picked the system adapts to correct the error. Or, if a human corrects a robot's errors in picking (robot was commanded to put a package into slot A but accidentally placed it straddling across slot A and adjacent slot B; and human places it into slot B though the system memory says the package is in slot A, the system must observe the human's action and adjust downstream robot actions.

In various embodiments, the global scheduler 522 may cause a station to operate more slowly than its maximum possible throughput at a given time. For example, the global scheduler 522 may explicitly instruct the local station scheduler (e.g., 524, 526, 528, or 530) to slow down and/or may make fewer slots available to the local station, e.g., explicitly by assigning fewer slots to the station or indirectly, such as by allowing upstream stations to fill more slots.

Figure 5C:
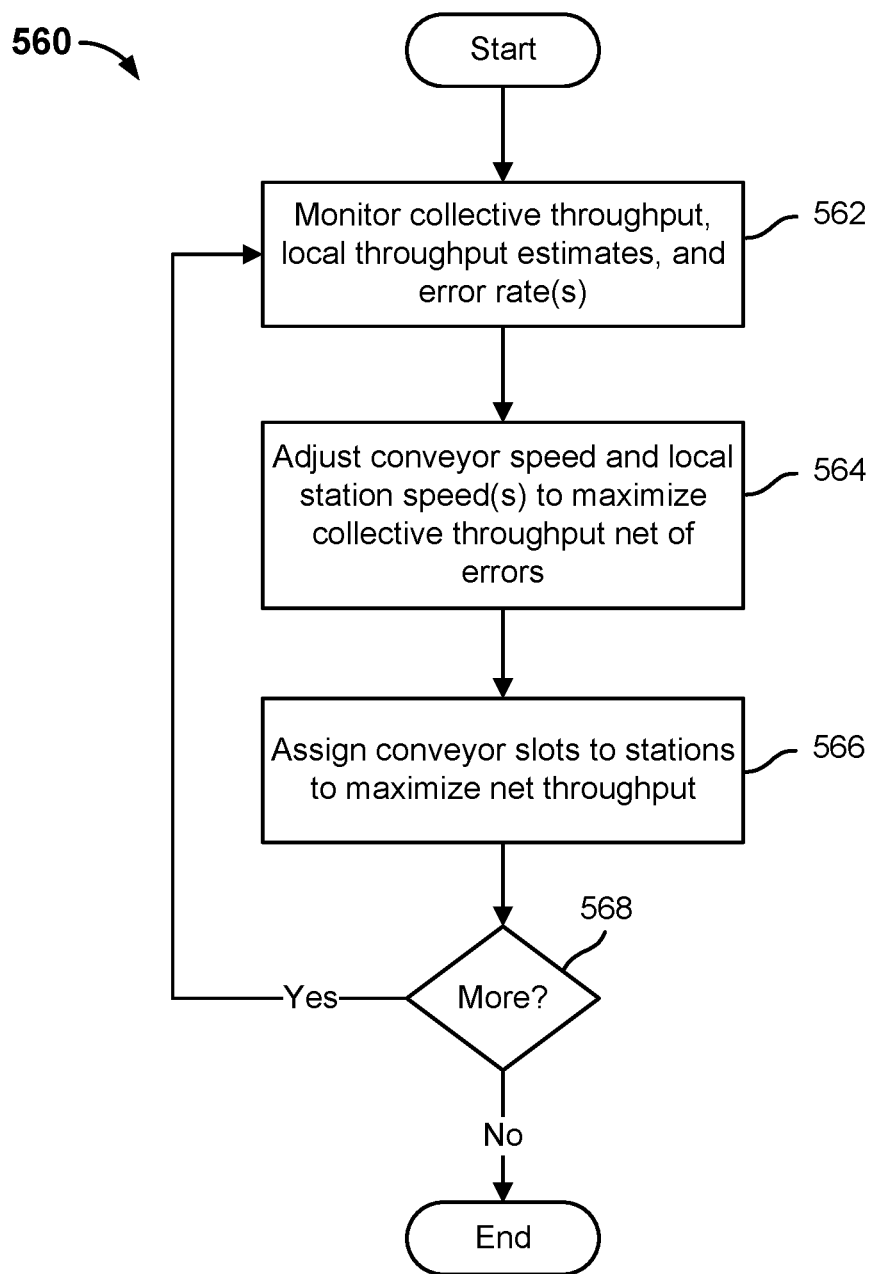
FIG. 5C is a flow chart illustrating an embodiment of a process to schedule and control resources comprising a robotic singulation system.

FIG. 5C is a flow chart illustrating an embodiment of a process to schedule and control resources comprising a robotic singulation system. In various embodiments, the process 560 of FIG. 5C is implemented by a global scheduler, such a global scheduler 522 of FIG. 5B.

In various embodiments, items arrive via a chute and/or conveyor. The chute/conveyor is fed, e.g., by humans, robots, and/or both, and items may arrive in clumps. With each addition to the flow at the input end, items may slide or flow down/along the chute or conveyor toward an end at which one or more robotic arms are provided to perform singulation, e.g., by grasping individual items and moving each one by one to a corresponding single item location on an output conveyor.

In various embodiments, images from one or more 3D or other cameras are received and processed. Flow of items down/through the chute/conveyor feeding a singulation station is modeled based on the image data. The model is used to predict a moment of relatively little or no movement, and at such a moment image data is used to identify and grasp an item. In some embodiments, the flow model is used to ensure the robotic arm is not in a position that would obscure the camera(s) at the moment of relatively little or no flow. In some embodiments, the system is configured to detect regions of relatively little or no flow within a broader flow. For example, flow may be analyzed within distinct, pre-define regions of a chute or other source conveyance or receptacle. The system may pick items for singulation from areas of little/stable and/or no flow and avoid for the time being regions in which less stable flow is occurring.

In some embodiments, the system identifies distinct areas of flow of items and guides the robot to pick the items accordingly from such areas. In some embodiments, the system predicts the motion of items on/through the chute or other source conveyance or receptacle, e.g., using a flow model computed using successive images from multiple cameras mounted over and around the chute. The flow model is used to predict a future position of one or more items as the item(s) flow(s) down the chute or other conveyance structure. For each time, an image is captured and/or grasp attempt at a time/location in which the item is expected to be based on the flow model. In some embodiments, real time segmentation is performed. For example, segmentation is performed within 30-40 milliseconds and/or some other rate that is as fast as the 3D camera frame rate. In some embodiments, real time segmentation results are used to track and/or model the flow of an individual item through the chute. A future position of an item is predicted based on its item-specific model/movement and a plan and strategy to grasp the item at the future location and time is determined and executed autonomously. In some embodiments, the position of the target item is updated continuously. In some embodiments, a trajectory of the robotic arm may be updated in real time, as the arm is in motion to grasp an item, based on a updated predicted future position of the item.

In some embodiments, if observed item flow is greater than a threshold speed, the system waits a configured amount of time (e.g., 100 milliseconds) and checks image data and/or flow rates again. The system may repeat and/or vary the length of such waits until a flow condition stable enough to have a high likelihood of successful grasp is observed. In some embodiments, different areas of the chute may have different speed thresholds which are allowed. For example if an area is far away from the actual spot where the robot is picking, a higher moving speed is tolerated in some embodiments, since unstable flow in that region may not be expected to disturb the operation being performed by the robot at that time. For example, a parcel which tumbles ("high speed") at top of the chute may not be of concern if the robot is picking from the bottom of the chute. However, if the tumbling items were to get closer to the pick area, it may not be tolerable, since it can occlude other objects or move them around by hitting them. In some embodiments, the system detects flow by region and/or location relative to an anticipated pick area and tolerates less stable flow in area removed (sufficiently distant) from the area(s) from which the robot next expects to pick.

In the example shown in FIG. 5C, at 562, collective throughput, local singulation station observed and/or estimated (locally scheduled) throughput, and overall and station-specific error rates are monitored. At 564, the conveyor speed and local station speeds are adjusted to maximize collective throughput net or errors. At 566, conveyor slots are allocated to respective stations to maximize net throughput. While in this example conveyor slots are allocated/assigned explicitly, in some embodiments station speeds are controlled so as to ensure downstream stations have slots available to place items, without (necessarily) pre-assigning specific slots to specific stations. Processing continues (562, 564, 566) while any station has items remaining to be picked/placed (568).

FIGS. 6A through 6C illustrate an example of item flow through a feeder chute in an embodiment of a robotic singulation system. In various embodiments, the flow of items through a chute or other receptacle is modeled. The flow model is used in various embodiments to determine strategies to grasp items from the flow. In some embodiments, modeled and/or observed flow may be used to perform one or more of the following: to determine a grasp strategy and/or plan to grasp an item at a future location to which it is expected to flow; to determine grasp strategies for each of a plurality of items, and to determine and implement a plan to grasp a succession of items, each to be grasped at a corresponding future position determined at least in part based on the flow model; to ensure a robotic arm is in a position to avoid obscuring a view of an item at a future moment at a location in which the items is anticipated based on the model to be located and planned to be picked from; and to wait, e.g., for a computed (based on the model) or prescribed amount of time, to allow for the flow to become more stable (e.g., slower moving, items moving mostly in a uniform direction, minimal change or low rate of change of orientation, etc.).

Referring to FIGS. 6A through 6C, in the example shown, the flow model shows a currently mostly stable arrangement of items which the model indicates will continue to be relatively stable/uniform as items 602 and 604 are picked from the flow/pile. In various embodiments, the model information illustrated in FIGS. 6A through 6C would be used, potentially with other information (e.g., available grasp strategies, required/assigned station throughput, etc.), to determine and implement a plan to pick and place items 602 and 604 in succession, each from a location at which the model indicates it is expected to be at the time it is scheduled to be grasped.

FIGS. 6D through 6F illustrate an example of item flow through a feeder chute in an embodiment of a robotic singulation system. In this example, the model indicates the pile is moving in a relatively slow and uniform flow but will be disrupted (or is observed to have been disrupted) once the item 602 has been picked. In various embodiments, model information as shown in FIG. 6D through 6F may be used to determine to pick item 602 singly but then wait a bit for the pile/flow to stabilize before determining and implementing a grasp strategy and plan to pick and place other items from the pile/flow. In some embodiments, the flow may be detected to be so unstable as to risk one or more items tumbling or otherwise flowing out of the chute or other source receptacle before such items can be picked and singulated. In some embodiments, in such a circumstance the system may be configured to implement a strategy to use the robotic arm and/or end effector to stabilized the flow, such as by blocking the bottom of the chute to prevent an item overflowing it, using the end effector and/or robotic arm to block or slow the flow, such as by positioning the arm crosswise across the flow, etc.

Figure 7A:
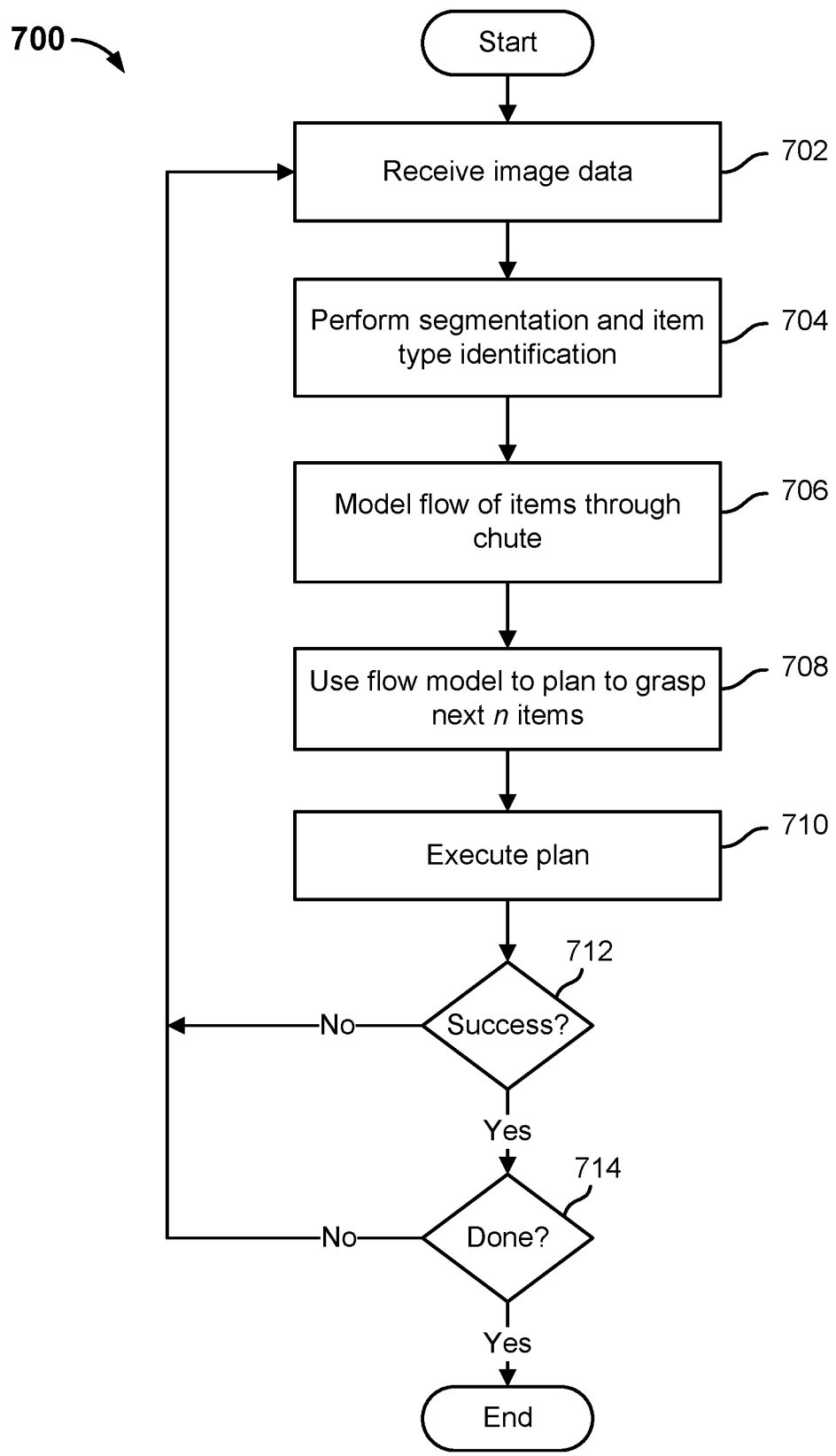
FIG. 7A is a flow chart illustrating an embodiment of a process to model item flow to pick and place items.

FIG. 7A is a flow chart illustrating an embodiment of a process to model item flow to pick and place items. In various embodiments, the process 700 of FIG. 7A is performed by a computer configured to model item flow, e.g., through a chute, and use the model to pick and place items, as in the examples described above in connection with FIGS. 6A through 6F. In various embodiments, the process 700 is performed by a computer, such a control computer 212 of FIGS. 2A and 2B. In some embodiments, the process 700 is performed by a robotic singulation station scheduler, such as schedulers 524, 526, 528, and 530 of FIG. 5B.

In the example shown in FIG. 7A, image data is received at 702. At 704, segmentation and item (e.g., type) identification are performed. At 706, flow of items through the chute or other receptacle is modeled. (While in this example steps 704 and 706 being performed sequentially, in some embodiments these steps are and/or may be performed in parallel.) At 708, the model is used to determine grasp strategies and a plan to grasp the next n items from the pile/flow. At 710, the plan is executed. If at 712 it is determined the attempt is not fully successful (e.g., one or more items failed to be grasped, item not in expected location, flow disrupted or otherwise not as expected) or if more items remain to be singulated (714), a further iteration of steps 702, 704, 706, 708, and 710 is performed, and successive iterations are performed until it is determined at 714 that no more items remain to be singulated.

In various embodiments, the system may take a photo and identify two (or more) objects to pick. The system picks and moves the first one; then, instead of doing a full scene re-compute to find a next package to pick, the system simply looks at whether the second package is disturbed. If not, the system picks it without doing a full recompute of the scene, which typically would save a lot of time. In various embodiments, the time savings is in one or more of sensor read latency, image acquisition time, system compute time, re-segmentation, masking, package pile ordering computations, and finally control and planning. If the second item is not where expected, the system does a full scene re-compute to find a next package to pick.

In some embodiments, a robot may use vision, depth, or other sensors to identify two graspable packages that are judged by the robot's control algorithm to be far enough apart so as not to be able to interfere with each other's picks (by destabilizing the pile and causing it to flow, or by hitting the other package etc.). Instead of repeating the sensor processing pipeline after picking the first package, the robot may directly proceed to pick the second package. That being said, statistically, there is a risk that the control algorithm's prediction may be incorrect or the pile may have moved due to some unforeseen event. In this scenario, the controller can pick in a more careful manner and use a model of predicted grasp suction cup activation (or other predicted sensory models, e.g., force, pressure, and other types of sensing modalities) to test whether the package being picked matches the earlier prediction (without having to re-do the vision computations).

Figure 7B:
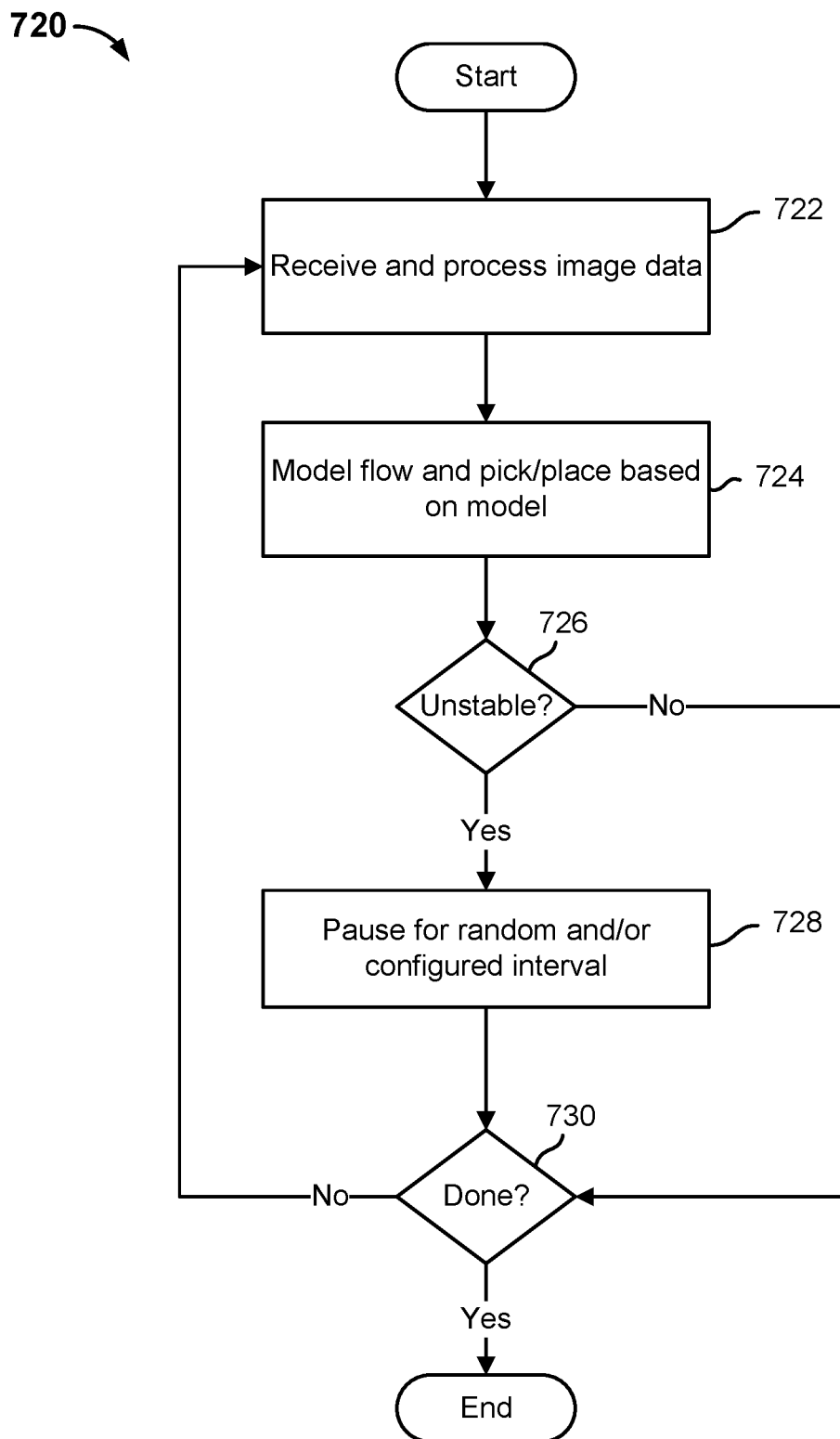
FIG. 7B is a flow chart illustrating an embodiment of a process to model item flow to pick and place items.

FIG. 7B is a flow chart illustrating an embodiment of a process to model item flow to pick and place items. In various embodiments, the process 720 of FIG. 7B is performed by a computer configured to model item flow, e.g., through a chute, and use the model to pick and place items, as in the examples described above in connection with FIGS. 6A through 6F. In various embodiments, the process 720 is performed by a computer, such a control computer 212 of FIGS. 2A and 2B. In some embodiments, the process 720 is performed by a robotic singulation station scheduler, such as schedulers 524, 526, 528, and 530 of FIG. 5B.

In the example shown in FIG. 7B, at 722, image data is received and processed. At 724, items are picked/placed based at least in part on the model, e.g., as in the process 700 of FIG. 7B. If at 726 an indication is received and/or determination made that the flow has become unstable, the system pauses at 728, e.g., for a random, prescribed, and/or configured interval, after which processing resumes and continues unless/until no more items remain to be picked/placed, after which the process 720 ends.

Figure 7C:
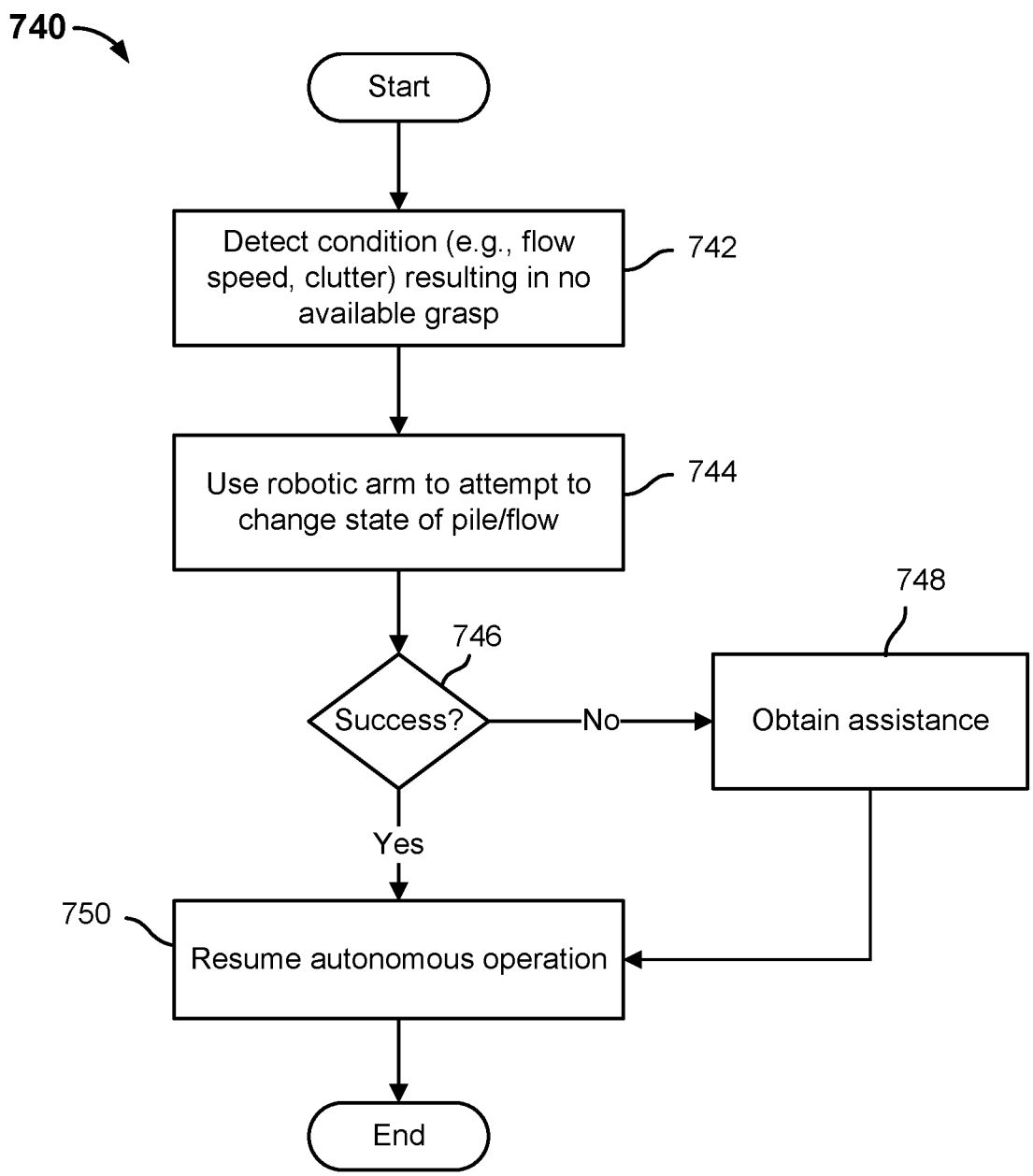
FIG. 7C is a flow chart illustrating an embodiment of a process to model item flow to pick and place items.

FIG. 7C is a flow chart illustrating an embodiment of a process to model item flow to pick and place items. In various embodiments, the process 740 of FIG. 7C is performed by a computer configured to model item flow, e.g., through a chute, and use the model to pick and place items, as in the examples described above in connection with FIGS. 6A through 6F. In various embodiments, the process 740 is performed by a computer, such a control computer 212 of FIGS. 2A and 2B. In some embodiments, the process 740 is performed by a robotic singulation station scheduler, such as schedulers 524, 526, 528, and 530 of FIG. 5B.

In the example shown in FIG. 7C, at 742 a condition in which no item can currently be grasped is detected. For example, the system may have attempted to determine grasp strategies for items in the pile, but determined that due to flow speed, clutter, orientation, overlap, etc., there is no item for which a grasp strategy having a probability of success greater than a prescribed minimum threshold is currently available. At 744, in response to the determination at 742, the system uses the robotic arm to attempt to change the state of the pile/flow in a way that makes a grasp strategy available. For example, the robotic arm may be used to gently nudge, pull, push, etc. an item or multiple items into different positions in the pile. After each nudge, the system may reevaluate, e.g., by re-computing the 3D view of the scene to determine if a viable grasp strategy has become available. If it is determined at 746 that a grasp (or multiple grasps each for a different item) has become available, then autonomous operation is resumed at 750. Otherwise, if after a prescribed number of attempts to change the pile/flow state a viable grasp strategy has not become available, then at 748 the system obtains assistance, e.g., from another robot and/or a human worker, the latter via teleoperation and/or manual intervention such as shuffling items in the pile and/or manually picking/placing items until the system determines that autonomous operation can be resumed.

Figure 8A:
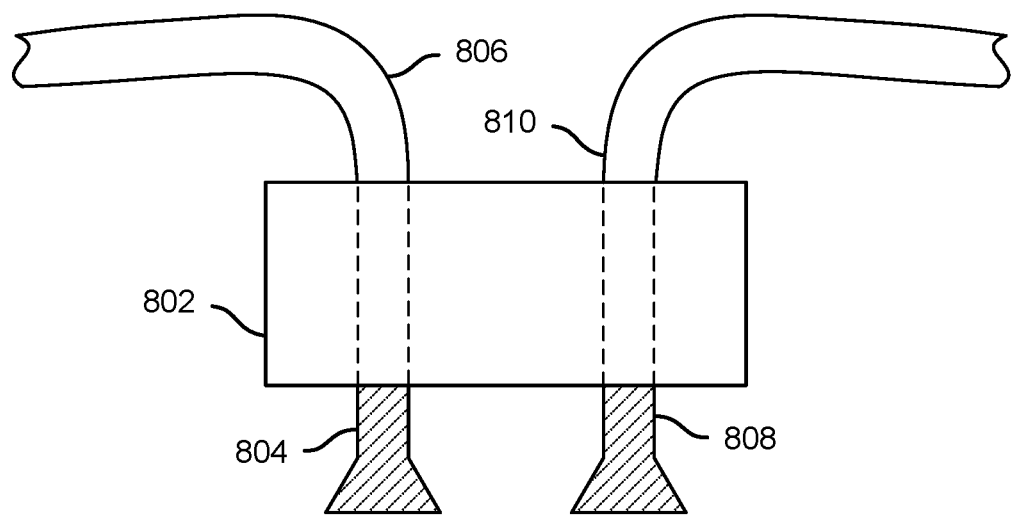
FIG. 8A is a block diagram illustrating in front view an embodiment of a suction-based end effector.
Figure 8B:
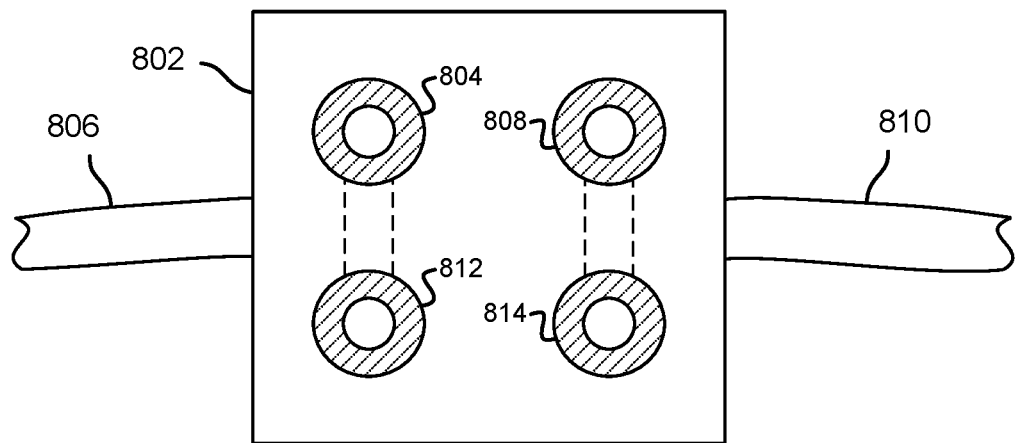
FIG. 8B is a block diagram illustrating a bottom view of the suction-based end effector 802 of FIG. 8A.

FIG. 8A is a block diagram illustrating in front view an embodiment of a suction-based end effector. In various embodiments, the end effector 802 may be used as the end effector of a robotic arm comprising a robotic singulation system, such as end effector 204 of FIG. 2A. FIG. 8B is a block diagram illustrating a bottom view of the suction-based end effector 802 of FIG. 8A.

Referring to FIGS. 8A and 8B, in the example shown end effector 802 includes four suction cups 804, 808, 812, and 814. In this example, a vacuum may be applied to suction cups 804 and 812 via hose 806, and a vacuum may be applied to suction cups 808 and 814 via hose 810. In various embodiments, the pairs of suction cups (i.e., a first pair comprising suction cups 804 and 812, and a second pair comprising suction cups 808 and 814) may be operated independently. For example, a single item, such as a smaller and/or lighter item, may be grasped using only one or the other of the suction cup pairs. In some embodiments, each pair may be used to grasp a separate item at the same time, enabling two (or in some embodiments more) items to be picked/placed simultaneously.

Figure 8C:
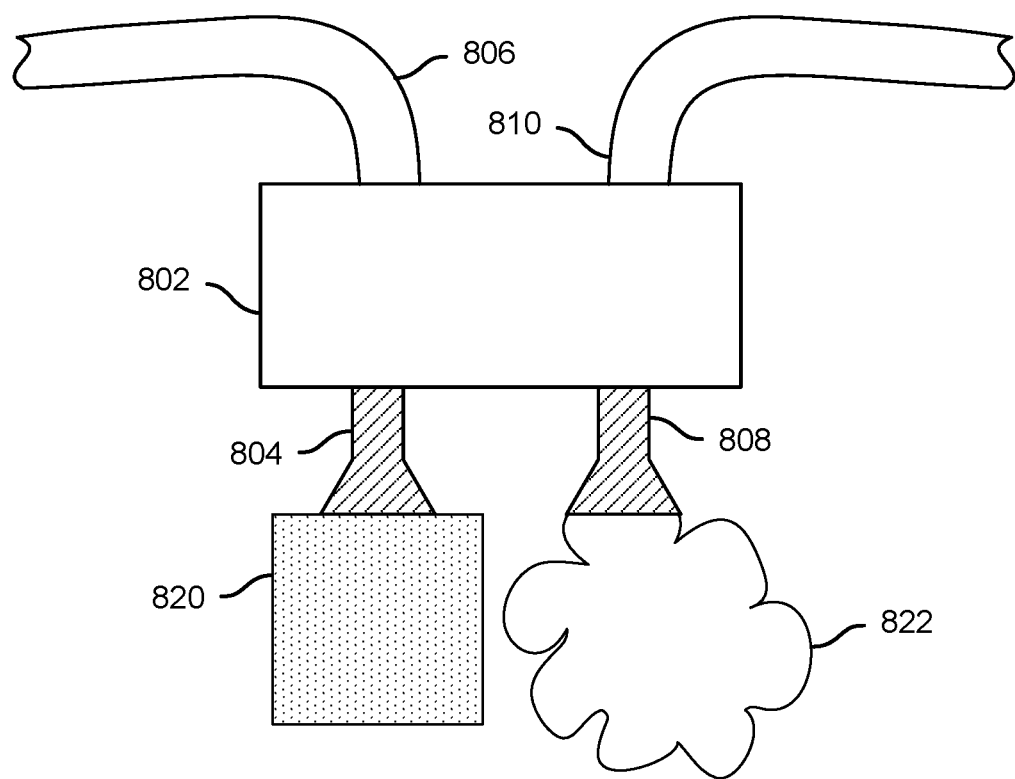
FIG. 8C is a block diagram illustrating in front view an example of multi-item grasp using the suction-based end effector 802 of FIG. 8A.
Figure 8D:
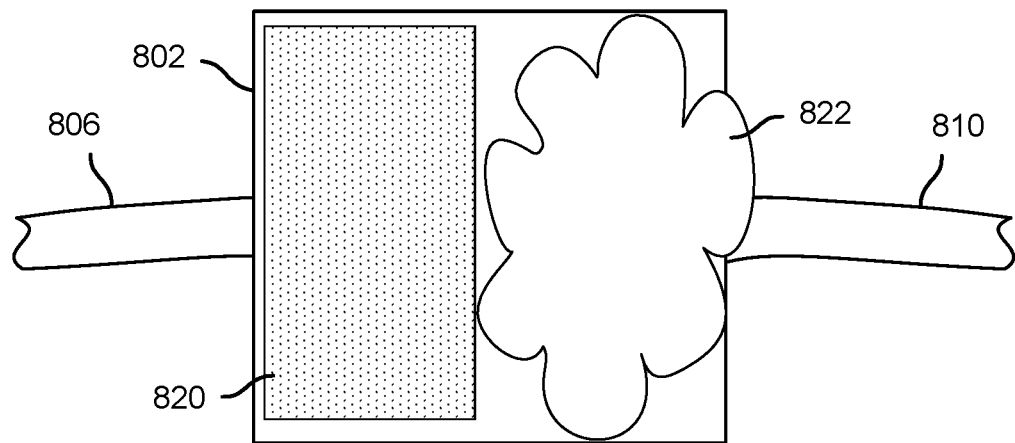
FIG. 8D is a block diagram illustrating in bottom view an example of multi-item grasp using the suction-based end effector 802 of FIG. 8A.

FIG. 8C is a block diagram illustrating in front view an example of multi-item grasp using the suction-based end effector 802 of FIG. 8A. FIG. 8D is a block diagram illustrating in bottom view an example of multi-item grasp using the suction-based end effector 802 of FIG. 8A. In this example, the respective pairs of suction cups have been actuated independently, each to grasp a corresponding one of the two items that are shown to have been grasped in the example shown.

In various embodiments, more or fewer suction cups and/or more or fewer independently-actuated sets of one of more suction cup may be included in a given end effector.

Figure 9:
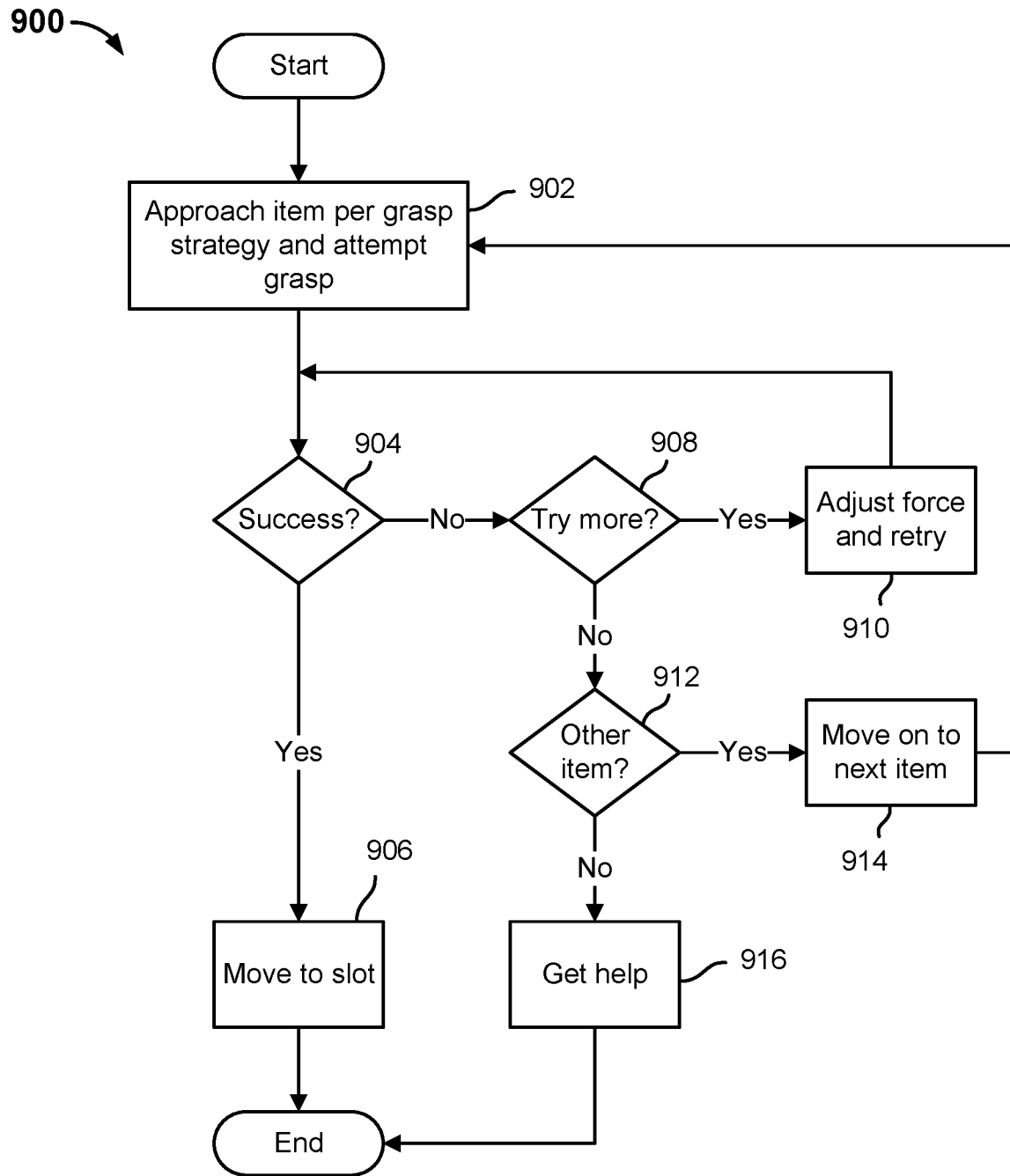
FIG. 9 is a flow chart illustrating an embodiment of a process to pick and place items using a robotic arm and end effector.

FIG. 9 is a flow chart illustrating an embodiment of a process to pick and place items using a robotic arm and end effector. In various embodiments, the process 900 of FIG. 9 may be implemented by a computer, such as control computer 212 of FIG. 2A and FIG. 2B.

When using a suction based end effector, such as end effector 802, pressing too hard to ensure suction cup engagement may damage fragile items and/or packaging. In addition, sensor readings may vary based on packaging type. For example, suction sensor readings when grasping corrugated boxes (air leaks from the grooves/paper) may be different from plastic poly bags. In some embodiments, if the package type is known, sensor readings are evaluated and/or adjusted accordingly. In some embodiments, if the sensor reading associated with successful grasp of a package of the determined type is not achieved on initial engagement, additional force and/or suction may be applied to achieve a better grasp. Such an approach increases the likelihood of a successful grasp and is more efficient than determining the grasp has failed and starting over.

In the example shown in FIG. 9, at 902 to robotic arm is used to approach and attempt to grasp an item according to a grasp strategy determined and selected to grasp the item. At 904 a determination is made as to whether the item was grasped successfully. For example, one or more of force (weight) sensors, suction/pressure sensors, and image data may be used to determine whether the grasp was successful. If so, at 906 the item is moved to its assigned and/or a next available slot. If it is determined at 904 that the grasp was not successful and the system determines at 908 to make a further attempt (e.g., fewer than prescribed maximum number of attempts not yet reached, item not determined to be too fragile to apply more force, etc.), then at 910 the system adjusts the force being applied to engage the item (and/or, in various embodiments, one or more of the grasping pose—i.e., position and/or orientation of the robotic arm and/or end effector) and tries again to grasp the item. For example, the robotic arm may be used to push the suction cups into the item with slightly greater force prior to actuating the suction and/or greater suction may be applied.

If it is determined at 908 that no further effort should be made at this time to grasp the item, the process advances to 912 at which it is determined whether there are other items available to be grasped (e.g., other items are present in the chute and the system has a grasp strategy available for one or more of them). If so, at 914 the system moves on to the next item and performs an iteration of step 902 and following steps with respect to that item. If there is no remaining item and/or no item for which a grasp strategy is available, then at 916 the system obtains assistance, e.g. from another robot, a human via teleoperation, and/or a human via manual intervention.

In various embodiments, the number and/or nature of further attempts to grasp an item, as in steps 908 and 910, may be determined by factors such as the item or item type, item and/or packaging characteristics determined by item type, item and/or packaging characteristics determined by probing the item with the robotic arm and end effector, items attributes as determined by a variety of sensors, etc.

Figure 10A:
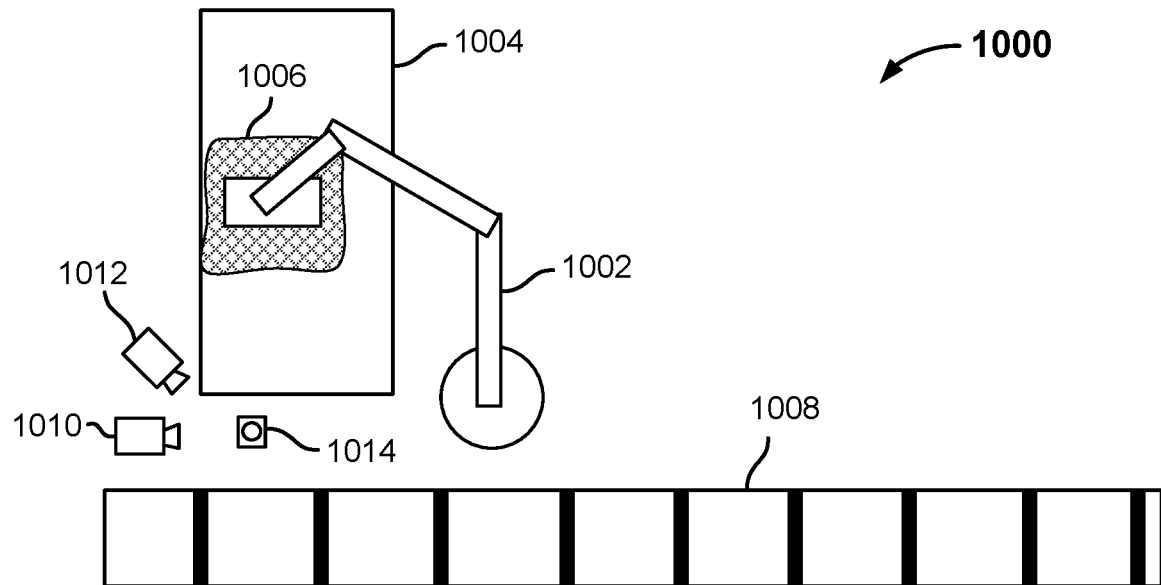
FIG. 10A is a diagram illustrating an embodiment of a robotic singulation system.

FIG. 10A is a diagram illustrating an embodiment of a robotic singulation system. In the example shown, robotic singulation station 1000 includes a robotic arm 1002 operated under control of a control computer (not shown in FIG. 10A) to pick items from a chute or other receptacle 1004, such as item 1006 in the example shown, and place them singly on segmented conveyor 1008.

In various embodiments, the robotic singulation station 1000 is controlled by a control computer configured to use a multi-view array of sensors, comprising cameras (or other sensors) 1010, 1012, and 1014, in this example, to scan address or other routing information locally, at the station 1000, at least in certain circumstances.

Figure 10B:
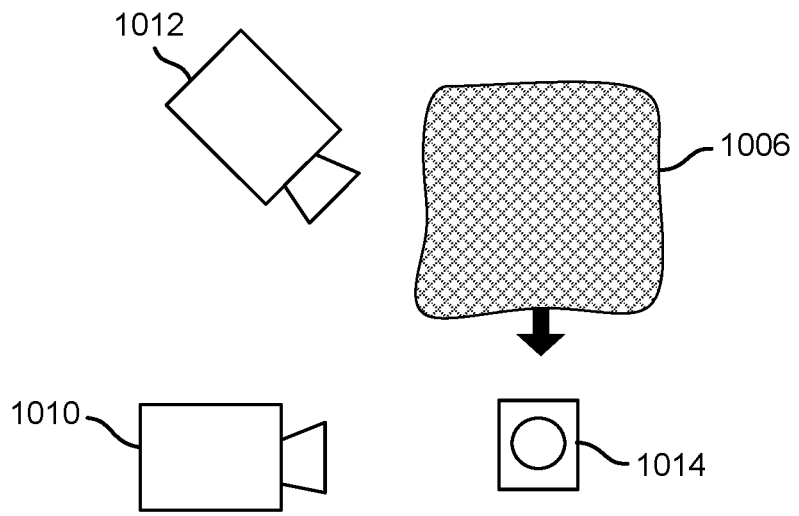
FIG. 10B is a diagram providing a close up view of the multi-view sensor array comprising cameras (or other sensors) 1010, 1012, and 1014 of FIG. 10A.

FIG. 10B is a diagram providing a close up view of the multi-view sensor array comprising cameras (or other sensors) 1010, 1012, and 1014 of FIG. 10A.

In various embodiments, sensors such as cameras (or other sensors) 1010, 1012, and 1014 are positioned to read routing information (e.g., text address, optical or other code, etc.) regardless of the orientation of the parcel as placed on the output conveyor by the robot. For example, if the parcel is placed label down a scanner across which parcel slides and/or is swiped reads the label and associates sorting/routing information with the corresponding location on the output conveyor.

The challenges with picking objects from piles (which may be flowing) and placing them on to a singulating conveyor is that the singulation conveyor needs to associate a package barcode with each package in a conveyor belt slot. Based on the package's orientation in the bulk pile from which the robot is picking, the robot might find a situation where the barcode actually faces down. In some embodiments, a robotic singulation system as disclosed herein may be used to flick or otherwise flip an item into a position in which the barcode or other label or routing information faces up. In some embodiments, the robot arm use its motions to flip the package by using controlled slipping due to gravity, if the end effector is pinch gripper (e.g., gripping at an end and letting the item begin to rotate via slippage/gravity before being release once the flipping motion has been initiated), or controlled suction release sequence on multiple suction cups and gravity to reorient a package (e.g., releasing suction on a cups at one end of the effector while still applying suction at the other end, to initiate rotation about an axis around which the item is to be flipped). However, flipping the package before placing it on the conveyor belt may damage a package, may not work, and/or may take a lot of time and could require another hand (e.g., another robot), which is expensive. In some embodiments, a system as disclosed herein may recognize an item is of a type that may require actions to ensure the label can be read. For example, a package in a polyethylene ("poly") or other plastic or similar bag may need to be placed such that the packaging is flattened and/or smoothed out, for downstream scanners to be able to read the label. In some embodiments, a robotic arm may be used to smooth and/or flatten the packaging, e.g., after placement. In some embodiments, such an item may be dropped from a prescribed height, to aid in having the packaging become flattened enough to read. In various embodiments, the robot may flatten plastic bags by throwing them onto the chute or conveyor before picking and/or reading at the station, using actuated suction cups to stretch the bags after picking them up, performing bi-manual (two robotic arm) manipulation to un-wrinkle deformable items, etc. In some embodiments, a blower or other mechanism may be used to smooth the package after placement. The blower may be standalone/stationary mounted or integrate with/onto the robotic arm.

In some embodiments, a multi-axis barcode (or other) scanner or sensor is positioned downstream on the conveyor belt 1008, one that can scan barcodes on the top or bottom. However this only works if the conveyor belt has a transparent bottom or if there is a sequencing operation where the package is passed over a transparent (or open) slot with a barcode reader looking up through the slot.

In various embodiments, if a package cannot readily be placed on the conveyor 1008 with the label facing up, so it can be easily scanned by an overhead scanner, then an array of sensors at the singulation station, such as cameras (or other sensors) 1010, 1012, and 1014 in the example shown in FIGS. 10A and 10B. In some embodiments, if the top of the package is visible, a barcode or other address information may be read as part of the computer vision scanning pipeline itself and/or using a camera mounted on the robotic arm 1002 and/or the end effector. If the barcode is on the side or on the bottom or otherwise occluded, the cameras (or other sensors) 1010, 1012, and 1014 are used to scan the package as the robot lifts it up and moves it to the conveyor belt or bin.

To do this correctly, in some embodiments, the robot modifies its controller and motion plan to guarantee that the package is scanned in flight, which may require positioning the object in an optimal way for a barcode scanner to view it while at the same time constraining the motion path so the object lands on an empty slot This is particularly hard for barcode scanning at the bottom or sides since the barcode scanners must be placed in an optimized configuration to simplify the motion planning task for the robot, and to make sure the robot can do the scan and place rapidly.

The configuration of the scanners and the movement plan of the robot is dynamically impacted by the package itself, since the package size and weight may require differently positioning the object as the robot tries to barcode scan it (also see the grasping/speed optimization based on package type section for examples of how the robot must adapt its motion).

The package height is typically unknown when picked out of a dense pile since the cameras or other sensors can't see the bottom of the pile. In this case, the robot uses a machine learning or geometric model to predict the height of the object. If the height estimate is too low, the robot will hit the barcode scanner with the object. If the height estimate is too high, the robot won't be able to scan the object. One side of the error spectrum is catastrophic (item hits scanner) while the other merely causes a replanned trajectory. In various embodiments, the robot control algorithm prefers to use the safer side and assume the object is taller than not so as to avoid collisions. If the object is too far away, the robot can gradually bring it closer to the barcode scanner with a human-like shaking motion so it gets scanned.

Figure 10C:
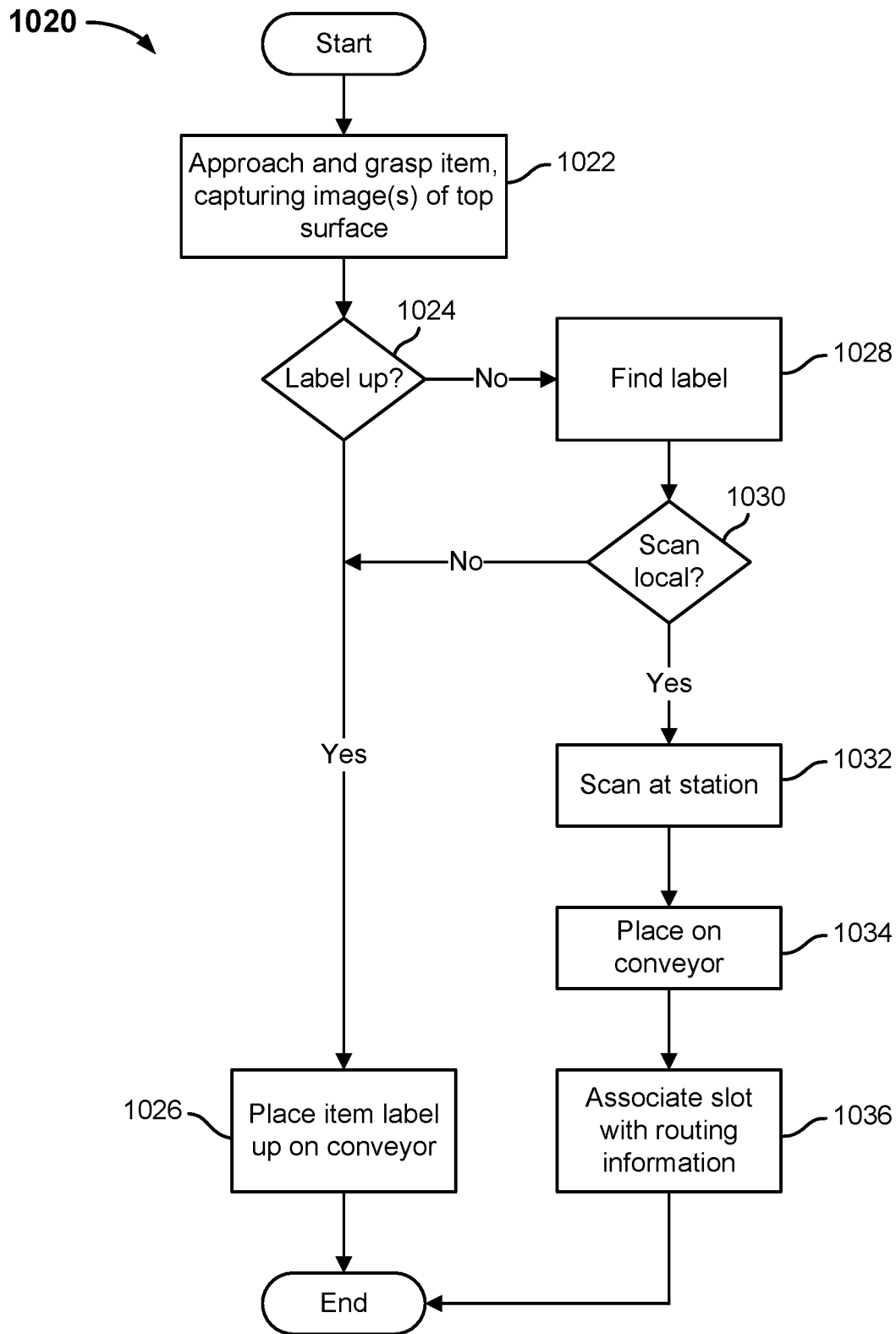
FIG. 10C is a flow chart illustrating an embodiment of a process grasp and scan items.

FIG. 10C is a flow chart illustrating an embodiment of a process grasp and scan items. In various embodiments, the process 1020 of FIG. 10C is performed by a control computer configured to control operation of a robotic singulation station, such as station 1000 of FIG. 10A. In the example shown, at 1022 the robotic arm is used to approach and grasp an item. An image of the top surface of the item is captured as the item is approached and/or grasped. In various embodiments, a camera pointed at the item/pile, such as a camera mounted near the station and/or on the robotic arm and/or end effector, may be used to capture the image. At 1024, the image is processed to determine whether the address label or other routing information is on the top surface. If so, at 1026 the item is placed on the conveyor with that side up.

If the label is not on the top surface as grasped (1024), at 1028 the system uses one or more local sensors to attempt to find the label. If the label is found and is on a surface such that the robotic singulation system can place the item on the conveyor with the label rotated up, then at 1030 it is determined that a local scan is not necessary and the package is rotated and placed on the conveyor, at 1026, such that the label is up. If instead the label cannot be found or the package cannot be rotated to place it up, then it is determined at 1030 that the label should be scanned locally. In such a case, at 1032 the label is scanned locally, e.g., using a multi-axis sensor array such as the cameras 1010, 1012, and 1014 of FIGS. 10A and 10B. The package is placed on the conveyor at 1034, and at 1036 the routing information determined by scanning the label locally is associated with the slot or other segmented location on the conveyor on which the item was placed.

Downstream, the routing information determined by scanning the item's label locally, at the robotic singulation station, is used to sort/route the item to an intermediate or final destination determined based at least in part on the routing information.

Figure 11:
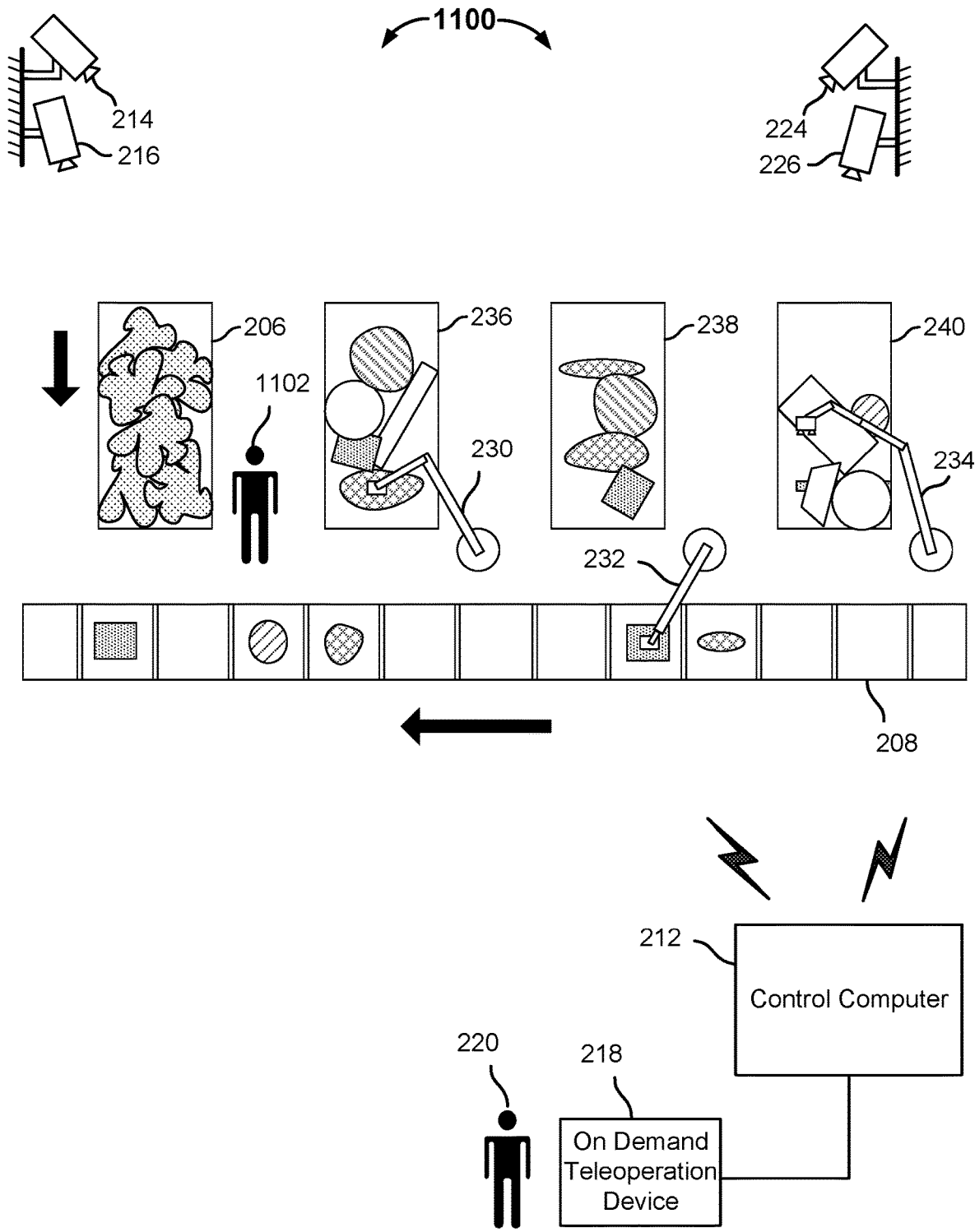
FIG. 11 is a diagram illustrating an embodiment of a multi-station robotic singulation system that incorporates one or more human singulation workers.

FIG. 11 is a diagram illustrating an embodiment of a multi-station robotic singulation system that incorporates one or more human singulation workers. In the example shown, the robotic singulation system 1100 includes the elements of the system of FIG. 2B, except that at the leftmost station (as shown) the robotic arm 202 has been replaced by a human worker 1102

In some embodiments, a robotic system includes one or more human singulation workers, e.g., at a last or other downstream station, as in the example shown in FIG. 11. The system and/or human workers provide difficult-to-singulate items (e.g., big floppy bags) to the workstation with the human worker. The robotic system leaves slots open to be filled by the human worker.

In some embodiments, each singulation station includes room for one or more robots and one or more human workers, e.g., to work together at the same station. The location for a human worker provides sufficient space for the worker to perform singulation in an area in which the robotic arm will not extend. In various embodiments, the human worker may augment robotic arm throughput, fix misplacements, incorrect orientation (to scan label, for example), ensure conveyor slots not filled by an upstream robotic or other worker are filled, etc.

Considering that the singulation workspace is often limited the following situations are handled by the controller (e.g., control computer), in various embodiments:

If the robot decides that the flow of packages is too fast or some packages are infeasible to grasp, it moves out of the way, engages safety mode, and triggers a message to a human operator to come and assist it.

If the robot decides that packages are hard to pick (e.g., too clumped up to pick, or stuck in a corner or edge, has sharp/pointy features that could damage suction cups of end effector, too heavy, etc.), it moves out of the way, engages safety mode, and triggers a message to a human operator to come and assist it.

Alternatively, it presents a pick decision on a software interface to a remote operator who guides the robot to make a right pick; the pick is a high level guidance provided by a human (not direct teleoperation) and is executed by the robot's picking logic above.

Alternatively, the robot nudges or pushes all the unpickable packages into a "return or unpickable item chute" that then routes them to a human handler.

If the flow of packages is too high, then the robot may trigger a human fallback. In this situation the robot moves into safety mode, out of the way of the human. The control system prepares for two options: (i) a human operator has enough space and is able to operate next to the robot to temporarily help pick some packages and reduce overall flow; or (ii) a human operator moves the entire robot physically out of the way to a non-obtrusive location (say under the chute) and performs picks normally. In both situations, the computer vision system continues to monitor the human's picking and uses that data to make the robot learn to do better in the type of situation encountered.

In some embodiments, a single singulation station may have both human and robotic workers to pick and singulate items. The human may singulate items the human is trained to pick, such as items known to be difficult to pick and place via autonomous robotic operation. In some embodiments, the system monitors movement of the human worker and uses the robotic arm to pick, move, and place items via trajectories that avoid coming near the human worker. Safety protocols ensure the robot slows or stops its movement if the human gets too near.

Figure 12:
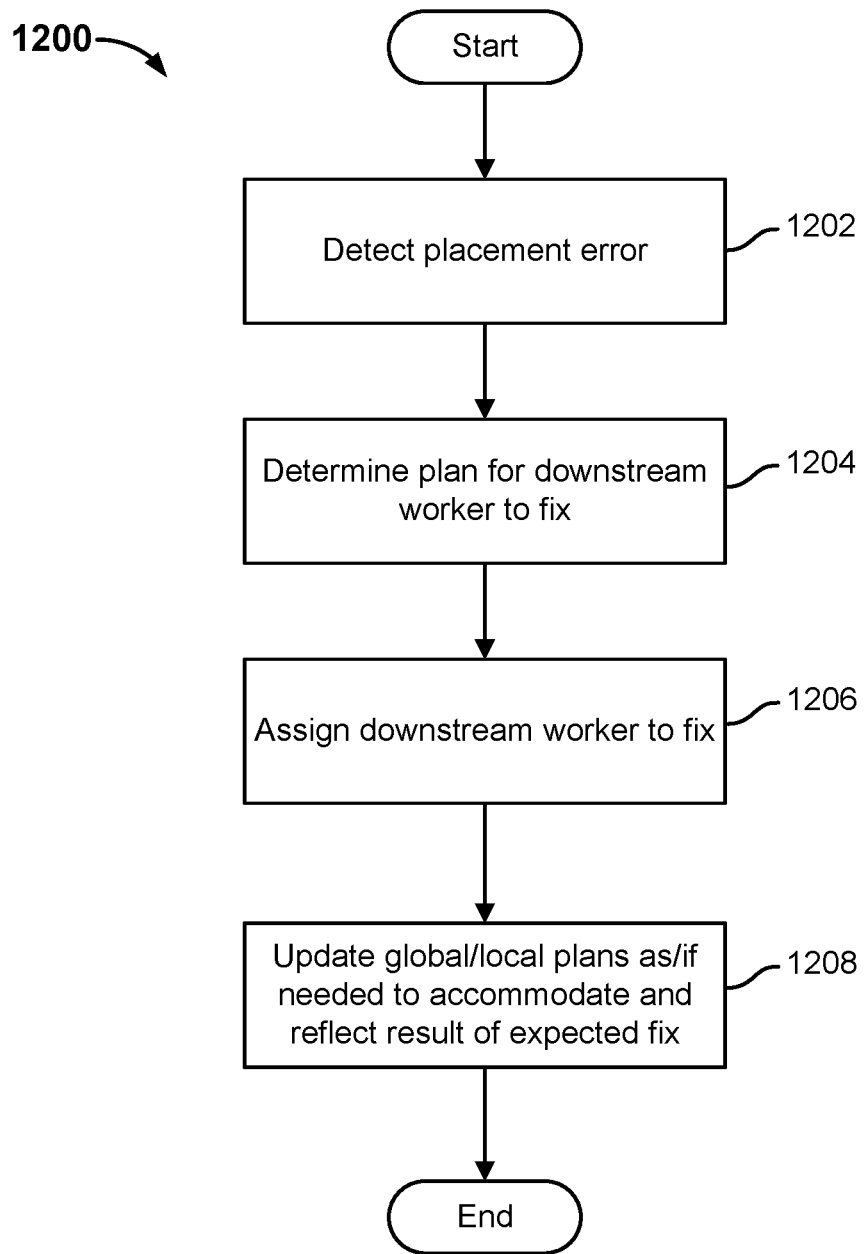
FIG. 12 is a flow chart illustrating an embodiment of a process to detect and correct placement errors.

FIG. 12 is a flow chart illustrating an embodiment of a process to detect and correct placement errors. In various embodiments, the process 1200 of FIG. 12 is performed by a control computer, such as control computer 212 of FIGS. 2A and 2B.

At 1202, a placement error is detected. For example, one or more of images processed the vision system, force sensors on the robotic arm, pressure sensors detecting a loss of vacuum, etc. may be used to detect that an item was dropped before being placed. Or, image data may be processed to determine that an item was not placed on the intended slot on the conveyor, or that two items have been placed in the same slot, or that an item is placed in an orientation such that it will not be able to be scanned downstream, etc.

At 1204, the controller determines a plan for a downstream worker, such as another robotic arm and/or a human worker to fix the detected error. At 1206, the downstream worker is assigned to fix the error, and at 1208 to global and/or any affected local plans are updated, as needed, to reflect use of the downstream worker to fix the error. For example, the downstream worker may no longer be available, or available as soon, to perform a local task that the local scheduler may have assigned to it. In various embodiments, upon the resource (e.g., robotic arm) being assigned to fix an error detected upstream, the local scheduler will update its local plan and assigned tasks to incorporate the error correction task that has been assigned.

In another example, if a robot places two packages on to a slot that is supposed to hold one package, a downstream camera or other sensor can identify the error and share the information with a downstream robot. The downstream robot's control algorithm, in real-time, can deprioritize a pick, and instead pick the extra package and place it on an empty slot (or in its own pile to be picked and placed singly in a slot later). In some embodiments, a local barcode scanner may be used to scan the package, enabling the system to ensure the package barcode becomes associated with the slot in which it ultimately is placed.

In some embodiments, a quality monitoring system is provided to detect missed placements, dropped items, empty slots expected to contain an item, slots that contain more than one item, etc. In some embodiments, if there are more than one (or other required and/or expected) number of items in a slot of the segmented conveyor belt or other output conveyance the quality monitoring system checks to determine if some other slot is empty and takes corrective action to have the correct item moved from the slot having too many items to the empty slot. For example, a human worker or downstream robot may be tasked to pick the misplaced item from the slot having too many items and place it in the empty slot.

In various embodiments, techniques disclosed herein are used to provide a robotic singulation system capable of operating in most cases in a fully autonomous mode.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
receive sensor data via the communication interface, wherein the sensor data includes three dimensional image data associated with a workspace, and the workspace comprising an item;
use the sensor data to determine whether an item label is on an item surface oriented in a first orientation;
in response to determining that the item label is not on an item surface oriented in the first orientation, determine a location of the item label on another item surface; and
operate a robotic structure to handle the item according to the location of the item label.

2. The system of claim 1, wherein handling the item according to the location of the item label comprises:
determining to locally scan the item label locally using a sensor system based at least in part on the location of the item label;
causing the sensor system to locally scan the item label.

3. The system of claim 2, wherein:
after the item label is locally scanned, the item is handled by the robotic structure; and
handling the item includes picking the item from the workspace and placing the item on a conveyor.

4. The system of claim 3, wherein the conveyor is a singulation conveyance structure.

5. The system of claim 2, wherein the sensor system comprises a multi-view array of sensors, wherein the sensor system being configured to obtain label information across a plurality of possible item orientations.

6. The system of claim 2, wherein the processor determines to locally scan the label based at least in part on a determination that the robotic structure is unable to rotate the item to an orientation in which a downstream sensor is able to read the item label after the item is placed on a conveyor.

7. The system of claim 1, wherein handling the item according to the location of the item label comprises:
determining to scan the item label with a downstream sensor as the item is carried on a conveyor after the item is picked from the workspace and placed on a conveyor.

8. The system of claim 7, wherein the processor determines to scan the item label with the downstream sensor if the robotic structure is able to successfully place the item on the conveyor in an orientation in which the item label is viewable by the downstream sensor.

9. The system of claim 1, wherein the item label includes the label information that comprises routing information.

10. The system of claim 9, wherein the processor uses the routing information to sort or route the item to an intermediate or final destination.

11. The system of claim 1, wherein:
the processor is configured to generate a three-dimensional view of at least part of the workspace based at least in part on the three-dimensional image data;
one or more items are picked from the workspace based at least in part on the three-dimensional view generated at one or more points in time; and
at least a subset of a plurality of items in the workspace comprises a flowing pile of items.

12. The system of claim 1, wherein:
the processor is further configured to use the sensor data to model a flow of a plurality of items through the workspace; and
the model is used to operate a robotic structure to pick one or more items from the workspace and place each item singly in a corresponding location in a singulation conveyance structure.

13. The system of claim 12, wherein using the sensor data to model flow of a plurality of items through the workspace and to use the model to operate a robotic structure to pick one or more items from the workspace and place each item singly in a corresponding location in a singulation conveyance structure comprises:
generating a three-dimensional view of at least part of the workspace based at least in part on the three dimensional image data;
using the three-dimensional view as generated at different points in time to model the flow of at least a subset of the plurality of items through at least a portion of the workspace; and
using the model to determine and implement a plan to autonomously operate the robotic structure to pick one or more items from the workspace and place each item singly in the corresponding location in the singulation conveyance structure.

14. The system of claim 13, wherein using the sensor data to model flow of a plurality of items through the workspace and to use the model to operate a robotic structure to pick one or more items from the workspace and place each item singly in a corresponding location in a singulation conveyance structure comprises:
performing a time series analysis on the three-dimensional view as generated at different points in time; and
operating the robotic structure to pick one or more items from the workspace based at least in part on the time series analysis.

15. The system of claim 12, wherein the processor is configured to:
generate a three-dimensional view based at least in part on the three-dimensional image data;

use the three-dimensional view as generated at different points in time to model a flow of at least a subset of the plurality of items through at least a portion of the workspace; and use the model to determine and implement a plan to autonomously operate the robotic structure to pick one or more items from the workspace and place each item singly in a corresponding location in a singulation conveyance structure, wherein using the model to determine and implement the plan is based at least in part on predicting a future position of one or more items included in the plurality of items.

16. The system of claim 1, wherein the processor is configured to use the model to detect unstable flow of at least a subset of a plurality of items, and to pause autonomous operation in response to detecting said unstable flow.

17. The system of claim 1, wherein the processor is configured to determine, based at least in part on the sensor data, that no strategy is available to grasp any item from the workspace and to operate the robotic structure, in response to said determination, to move one or more items in the workspace.

18. The system of claim 1, wherein the robotic structure comprises a robotic arm.

19. A method, comprising:
receiving sensor data, wherein the sensor data includes three-dimensional image data associated with a workspace, and the workspace comprising an item;
using the sensor data to determine whether an item label is on an item surface oriented in a first orientation;
in response to determining that the item label is not on an item surface oriented in the first orientation,
determining a location of the item label on another item surface; and
operating a robotic structure handle the item according to the location of the item label.

20. A computer program product embodied in a non-transitory computer readable medium, comprising computer instructions for:
receiving sensor data, wherein the sensor data includes three-dimensional image data associated with a workspace, and the workspace comprising an item;
using the sensor data to determine whether an item label is on an item surface oriented in a first orientation;
in response to determining that the item label is not on an item surface oriented in the first orientation,
determining a location of the item label on another item surface; and
operating a robotic structure handle the item according to the location of the item label.

* * * * *